United States Patent
Soomro et al.

(10) Patent No.: US 12,430,743 B2
(45) Date of Patent: Sep. 30, 2025

(54) DETECTION OF HEAT TREATED MARKINGS ON A WOODEN PALLET

(71) Applicant: CHEP Technology Pty Limited, Sydney (AU)

(72) Inventors: Khurram Soomro, Ocoee, FL (US); Christopher J. Gerou, Orlando, FL (US); Miguel Ángel Zazo De La Rocha, Madrid (ES); Francisco Jesus Hidalgo, Madrid (ES); José Manuel Argibay Cañas, Madrid (ES); Daniel Tomer, Jerusalem (IL); Elazar Cohen, Jerusalem (IL); Moshe Safran, Jerusalem (IL)

(73) Assignee: CHEP Technology Pty Limited, Sydney (AU)

( * ) Notice: Subject to any disclaimer, the term of this patent is extended or adjusted under 35 U.S.C. 154(b) by 305 days.

(21) Appl. No.: 18/045,586

(22) Filed: Oct. 11, 2022

(65) Prior Publication Data
US 2023/0112603 A1 Apr. 13, 2023

Related U.S. Application Data

(60) Provisional application No. 63/262,453, filed on Oct. 13, 2021.

(51) Int. Cl.
*G06T 7/00* (2017.01)
*G06T 7/11* (2017.01)
(Continued)

(52) U.S. Cl.
CPC .............. *G06T 7/0004* (2013.01); *G06T 7/11* (2017.01); *G06T 7/12* (2017.01); *G06T 7/70* (2017.01); *G06V 10/25* (2022.01); *G06V 10/44* (2022.01); *G06V 30/10* (2022.01); *G06T 2207/30161* (2013.01)

(58) Field of Classification Search
CPC . G06T 7/0004; G06T 7/11; G06T 7/12; G06T 7/70; G06T 2207/30161;
(Continued)

(56) References Cited

U.S. PATENT DOCUMENTS

| | | | |
|---|---|---|---|
| 6,283,654 B1* | 9/2001 | Tsukagoshi | G06F 40/177 400/615.2 |
| 7,615,253 B2* | 11/2009 | Hauser | C03C 19/00 427/282 |

(Continued)

FOREIGN PATENT DOCUMENTS

| | | | | |
|---|---|---|---|---|
| CN | 115471734 A | | 12/2022 | |
| GB | 2584340 A | * | 12/2020 | G06K 9/00771 |

(Continued)

OTHER PUBLICATIONS

Greenhalgh, J., & Mirmehdi, M. (2015). Automatic detection and recognition of symbols and text on the road surface. In Pattern Recognition: Applications and Methods: 4th International Conference, ICPRAM 2015 (pp. 124-140). Springer International Publishing. (Year: 2015).*

(Continued)

*Primary Examiner* — Henok Shiferaw
*Assistant Examiner* — Toluwani Mary-Jane Ijaseun
(74) *Attorney, Agent, or Firm* — Alston & Bird LLP

(57) ABSTRACT

A pallet inspection system includes a frame configured to have a pallet receiving area to receive a wooden pallet to be inspected for having at least one mark indicating that wood in the pallet has been heat treated. Cameras are carried by the frame to generate images of the wooden pallet in response to the wooden pallet being in the pallet receiving area. A processor is to perform object detection on each image to detect if the mark is present, crop each image having the mark so that an area surrounding the mark within the image (Continued)

is removed, and perform image segmentation on each cropped image so that pixels within the cropped image are classified into regions. The processor determines readability of the regions in each cropped image based on respective readability criteria thresholds, with mark classifications being based thereon.

20 Claims, 23 Drawing Sheets

(51) Int. Cl.
*G06T 7/12* (2017.01)
*G06T 7/70* (2017.01)
*G06V 10/25* (2022.01)
*G06V 10/44* (2022.01)
*G06V 30/10* (2022.01)

(58) Field of Classification Search
CPC . G06T 2207/20081; G06T 2207/20132; G06T 2207/30168; G06T 7/13; G06T 7/136; G06T 2207/20021; G06V 10/25; G06V 10/44; G06V 30/10; G06V 30/148; G06V 10/255; G06V 10/751; G06V 30/1478; G06V 30/153; G06V 2201/09; G06V 30/19013; G06V 30/1908; G06V 30/2445
USPC .................................................. 382/141, 382
See application file for complete search history.

(56) References Cited

U.S. PATENT DOCUMENTS

| | | | |
|---|---|---|---|
| 9,327,406 B1 | 5/2016 | Hinterstoisser et al. | |
| 9,524,430 B1* | 12/2016 | Cho | G06V 30/413 |
| 11,120,267 B1* | 9/2021 | Pellegrino | G06V 20/35 |
| 2002/0104884 A1* | 8/2002 | Meier | G06K 7/1443 |
| | | | 235/462.25 |
| 2008/0000960 A1* | 1/2008 | Outwater | G06Q 10/08 |
| | | | 235/375 |
| 2012/0106787 A1* | 5/2012 | Nechiporenko | G06V 30/424 |
| | | | 382/103 |
| 2014/0147640 A1 | 5/2014 | Budi | |
| 2015/0105892 A1 | 4/2015 | Townsend et al. | |
| 2020/0394453 A1* | 12/2020 | Ma | G06T 7/12 |
| 2021/0133666 A1* | 5/2021 | Eckman | G06T 7/62 |
| 2021/0390296 A1* | 12/2021 | En | G06V 30/19173 |

FOREIGN PATENT DOCUMENTS

| | | | | |
|---|---|---|---|---|
| JP | 2004-265205 A | 9/2004 | | |
| JP | 2013010160 A | 1/2013 | | |
| JP | 2014-521532 A | 8/2014 | | |
| WO | WO-2015149751 A2 * | 10/2015 | | A61L 2/28 |
| WO | WO 2019/131318 A1 | 7/2019 | | |
| WO | WO 2021/075438 A1 | 4/2021 | | |

OTHER PUBLICATIONS

International Search Report and Written Opinion for International Application No. PCT/US2022/077937, dated Jan. 24, 2023, (11 pages), United States Patent and Trademark Office, US.

Japanese Office Action for Application No. 2024-522132, dated Jan. 7, 2025, 5 pages.

Extended European Search Report for Application No. 22881967.8, dated Jul. 14, 2025, 9 pages.

Thompson, et al., "Simulation and Evaluation of LentiMark Markers for Accurate Pose Estimation", IEEE, pp. 4112-4117, Oct. 7, 2018, doi: 10.1109/SMC.2018.00697. SMC.2018.00697.

* cited by examiner (READABLE)

(NON-READABLE)

DETECTION OF HEAT TREATED MARKINGS ON A WOODEN PALLET

RELATED APPLICATIONS

This application claims the benefit of U.S. provisional application Ser. No. 63/262,453 filed Oct. 13, 2021, which is hereby incorporated herein in its entirety by reference.

TECHNICAL FIELD

The present disclosure relates to pallets, and more particularly, to detecting markings on a wooden pallet indicating that the wood in the pallet has been heat treated.

BACKGROUND

Wooden pallets are used to transport a variety of bulk goods and equipment as required in manufacturing and warehousing operations. Wooden pallets used in international shipments are to be heat treated. One of the necessary steps for ensuring the safety of not only the product being shipped, but also the environment of the product's destination, is heat treatment.

Wood pallets are made from organic material. Trees do not grow in sterile surroundings. The ground they are rooted in, the air they are surrounded by, and the water they absorb are not only full of nourishing material, but also a plethora of pests. These pests, whether mature or in a larva stage, are unfortunately, all too easily transported from one area of the world to another in the pallet wood they inhabit. Therefore, governments, environmentalists, and pallet makers have come up with a variety of ways to kill them during the pallet production stage so they will not be introduced in places they did not originate and do not belong.

Heat treating a pallet is a phytosanitary process developed by the International Plant Protection Convention (IPPC), a treaty recognized by the World Trade Organization and overseen by the Food and Agriculture Organization. The goal is to prevent and to control the introduction and spread of pests and plant products. Once a pallet has been heat treated, it is stamped or marked with a globally recognized image which allows for more efficient transportation of goods.

SUMMARY

A pallet inspection system includes a rectangular-shaped frame configured to have a pallet receiving area to receive a wooden pallet to be inspected for having at least one mark indicating that wood in the pallet has been heat treated. A plurality of cameras are carried by the frame to generate images of the wooden pallet in response to the wooden pallet being in the pallet receiving area.

A processor is coupled to the plurality of cameras and is configured to receive the images for processing. The processing includes performing object detection on each image to detect if the mark is present, cropping each image having the mark so that an area surrounding the mark within the image is removed, and performing image segmentation on each cropped image so that pixels within the cropped image are classified into regions.

Readability of the regions is determined in each cropped image based on respective readability criteria thresholds. The mark in each cropped image is classified as readable based on the mark meeting the respective readability criteria thresholds.

The classified regions for each cropped image may include a boundary region, a symbol region, and an alphanumeric region, with the pixels in each region having a respective classification identifier associated therewith.

The boundary region may have a rectangular shape with first and second opposing sides, and a divider line extending between one of opposing sides. The symbol region and the alphanumeric region may be enclosed by the boundary region and separated by the divider line.

The classified regions may include a boundary region having a classification identifier associated therewith. Determining readability of the boundary region may include performing corner point detection to detect corner points, sampling the pixels between the detected corner points, and determining a number of the sampled pixels having the same classification identifier. The boundary region is identified as being readable based on the determined number of sampled pixels having the same classification identifier exceeding a boundary region threshold.

The classified regions may include a symbol region having a classification identifier associated therewith. Determining readability of the symbol region may include sampling the pixels within the symbol region, and determining a number of the sampled pixels having the same classification identifier. The symbol region is identified as being readable based on the determined number of sampled pixels having the same classification identifier exceeding a symbol region threshold.

The classified regions may include an alphanumeric region having a classification identifier associated therewith. Determining readability of the alphanumeric region may include identifying the pixels within the alphanumeric region having the same classification identifier, and determining a readability score for the identified pixels. The readability score may be selected within a readability scoring range. The alphanumeric region is identified as being readable based on the readability score exceeding a readability score threshold.

The classified regions may include an alphanumeric region having alphanumeric characters. The processor may be further configured to perform the following for each mark classified as readable. Detect lines within the alphanumeric region, with each line including the alphanumeric characters. Perform optical character recognition to read the alphanumeric characters in each line.

The processor may be further configured to perform the following in response to the wooden pallet having a pair of marks that are each classified as readable. Compare the alphanumeric characters read in one of the marks to the alphanumeric characters read in the other mark. Classify the wooden pallet as being compliant in response to the respective alphanumeric characters in each mark matching.

The cameras may be positioned so that each side of the pallet receiving area has a single camera focused on a portion of a side view of the wooden pallet where the mark is expected to be located.

The cameras may be positioned so that each side of the pallet receiving area has a pair of cameras, with the pair of cameras providing overlapping images of an entire side view of the wooden pallet.

Another aspect is directed to a method for detecting heat treated markings on a wooden pallet using the pallet inspection system as discussed above. The method includes generating images of the wooden pallet, performing object detection on each image to detect if a mark is present, and cropping each image having the mark so that an area surrounding the mark within the image is removed. Image segmentation is performed on each cropped image so that pixels within the cropped image are classified into regions. Readability of the regions in each cropped image is determined based on respective readability criteria thresholds. The mark in each cropped image is classified as readable based on the mark meeting the respective readability criteria thresholds.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Shipping products using wood packaging between countries is a process regulated by the International Plant Protection Convention (IPPC). Wooden materials like pallets can potentially carry diseases or insects from one country into another where an infestation would negatively impact the ecosystem. Composed of 183 plus member countries, the IPPC has established requirements around the treatment of wood packaging leaving and entering their countries to prevent infestations that could be harmful to their local plant life.

According to International Standards For Phytosanitary Measures No. 15 (ISPM 15), wood materials greater than 6 mm in width require debarking and heat treatment or methyl bromide fumigation. If heat treated, the wooden pallet is to be treated for at least 30 minutes and maintain a core temperature of 133° F. After the heat treatment or fumigation, wooden pallets must then be stamped or branded with a compliance mark.

Figure 1:
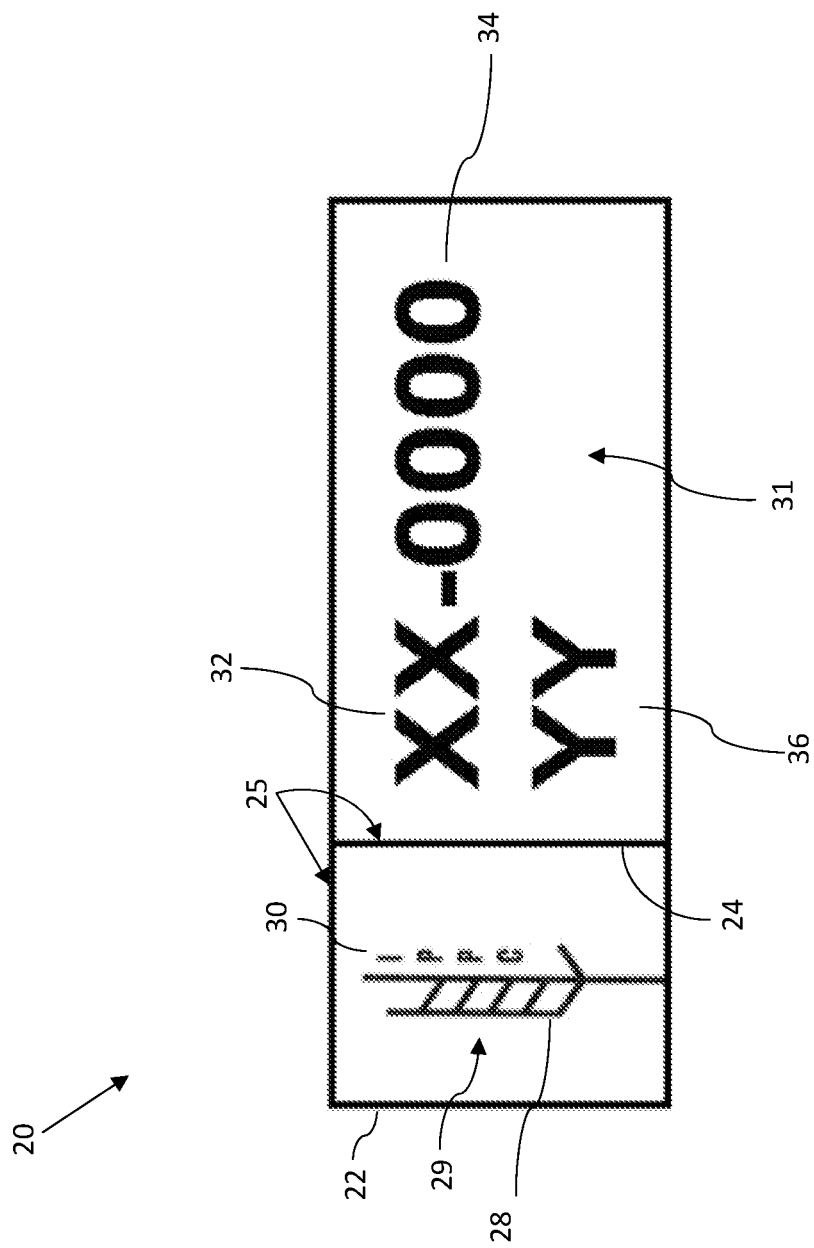
FIG. 1 is an example schematic representation on the format of a heat treated marking for use on wooden pallets.
Figure 2:
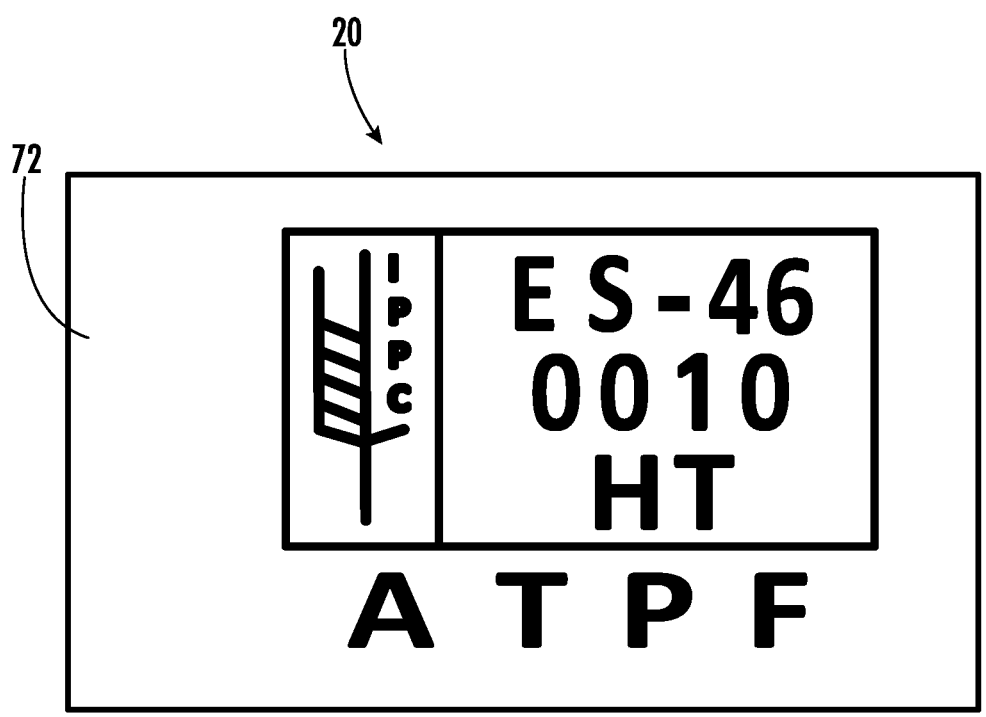
FIG. 2 is an image of a heat treated marking from a wooden pallet.

To indicate proper heat treatment or methyl bromide fumigation with wooden pallets, a 2" stamp or mark of compliance 20 is required, an example format of which is illustrated in FIG. 1. The illustrated format of the mark of compliance 20 occupies 2 lines. This format is not to be limiting. For example, the stamp or mark of compliance 20 may have a format that occupies a single line or occupies more than 2 lines. The stamp or mark of compliance 20 may also be referred to as an ISPM15 mark, a heat treated marking or a mark. An example image of an ISPM15 mark 20 on an area of a wooden pallet is illustrated in FIG. 2.

The ISPM15 mark 20 includes an external perimeter 22 and a divider line 24. The external perimeter 22 is rectangular shaped, and the divider line 24 extends between one of opposing sides of the external perimeter 22. The external perimeter 22 and the divider line 24 will be referred to as a boundary region 25.

In the region on the left side of the divider line 24 is an IPPC certification symbol. The IPPC certification symbol includes a tree symbol 28 with the letters IPPC 30 adjacent the tree symbol 28. This region will be referred to as a symbol region 29.

In the region on the right side of the divider line 24 are alphanumerics. This region will be referred to as an alphanumeric region 31. The alphanumerics include a country code 32, a producer code 34 and a treatment code 36. The country code 32 is two letters. As example, ES represents Spain, US represents the United States, GB represents Great Britain, and AU represents Australia. The producer code 34 is a series of unique alphanumerics to indicate the wood treatment agent or packaging manufacturer. This is a unique certification number that ensures that the wood packaging material can be traced back to the wood treatment agent or packaging manufacturer. The treatment code 36 represents the treatment applied to the wood packaging material. HT is the code for heat treatment, and MB is the code for methyl bromide fumigation.

The ISPM15 mark 20 is typically required on every 24 inches along the wooden pallet. Non-compliance may result in shipments being rejected by customs, resulting in costly fees associated with the re-export of the goods for the importer.

Consequently, there is a need to automate detection of ISPM15 markings 20 on a wooden pallet. This is particularly needed in high volume industries where pallet pools provide a lower total industry cost than one-way pallets.

After the bulk goods and equipment are off loaded from the pooled pallets, the wooden pallets are returned to pallet inspection and repair facilities. As part of the inspection, ISPM15 markings 20 are to be detected. For the wooden pallet 40 to be compliant, a pair of ISPM15 markings 20 are to be identified and the alphanumerics in each alphanumeric region 31 need to match each other.

Figure 3:
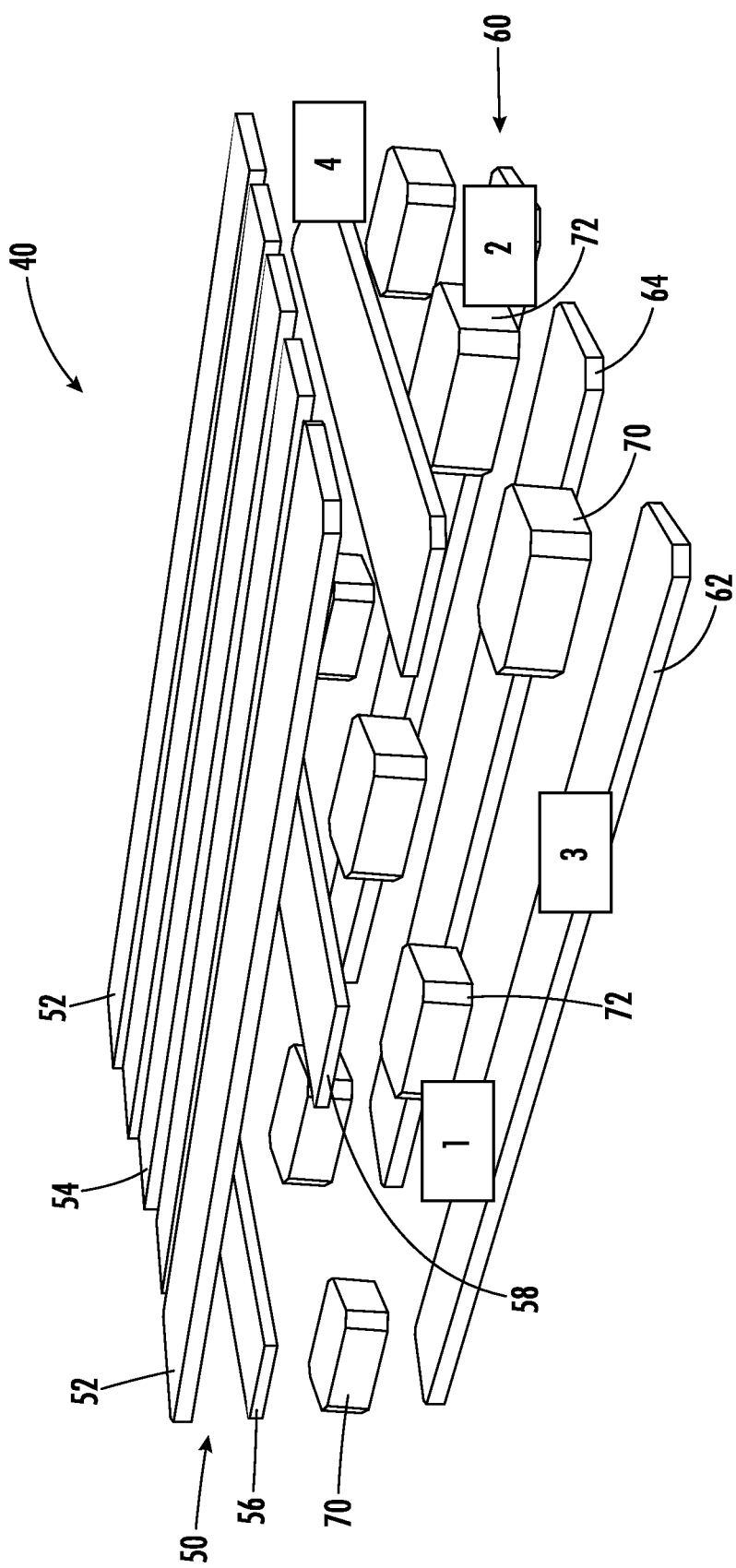
FIG. 3 is an exploded view of a wooden pallet showing locations on where the heat treated marking illustrated in FIG. 1 can be placed.

Referring now to FIG. 3, an exploded view of an example wooden pallet 40 will be discussed. The wooden pallet 40 is for discussion purposes on the different placement locations of the ISPM15 mark 20. The wooden pallet 40 as illustrated is not to be limiting as other wooden pallet configurations are readily available.

The wooden pallet 40 includes a top deck 50, a bottom deck 60, and a plurality of wooden support blocks 70, 72 coupled between the top and bottom decks. The support blocks 40, 46 form a gap between the top and bottom decks 50, 60 for receiving a lifting member, such as fork lift tines.

The top deck 50 includes a pair of spaced apart wooden end deck boards 52, and wooden intermediate deck boards 54 positioned between the end deck boards 52. Also included within the top deck 50 are a pair of spaced apart wooden connector boards 56 and a wooden intermediate connector board 58. The connector boards 56 and the intermediate connector board 58 are orthogonal to the end deck boards 52 and the intermediate deck boards 54. The end deck boards 52 and the intermediate deck boards 54 are positioned on the connector boards 56 and are directly coupled to the support blocks 70, 72 via nails.

The bottom deck 60 includes bottom deck boards 62, 64 orientated in the same direction as the end deck boards 52 and the intermediate deck boards 54 in the top deck 50. The bottom deck boards 62, 64 may also be referred to as base boards, and are directly coupled to the support blocks 70, 72 via nails.

The support blocks include corner support blocks 70 and center support blocks 72 between the corner support blocks 70. In total, there are 9 support blocks 70, 72 positioned in rows of 3. The outer rows each include a pair of outer support blocks 70 and a single center support block 72, and the center row includes all center support blocks 72. The corner support blocks 70 and the center support blocks 72 each have a rectangular shape.

The different placement locations of the ISPM15 mark 20 include, for example, the center support blocks 72 as indicated by the boxed numbers 1 and 2, the outer bottom deck boards 62 as indicated by the boxed number 3, and on an outer edge of connector boards 56 in the top deck 50 as indicated by the boxed number 4.

Figure 4:
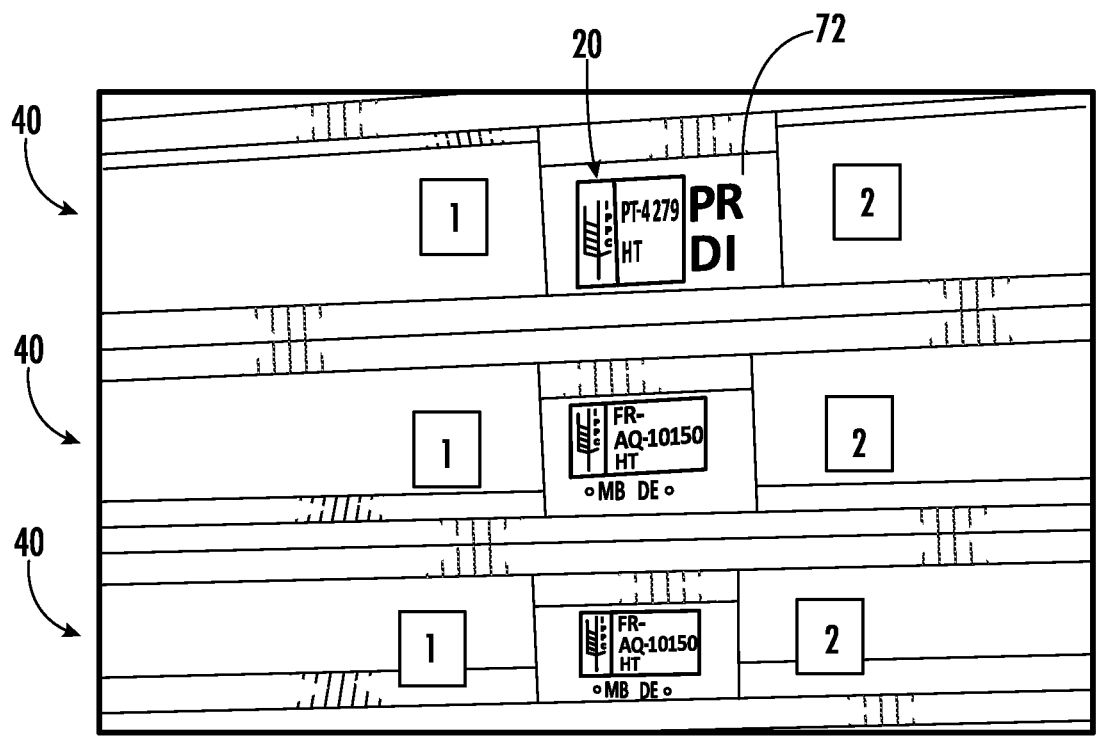
FIG. 4 is a partial side view of stacked wooden pallets having heat treated markings on the center support blocks.
Figure 5:
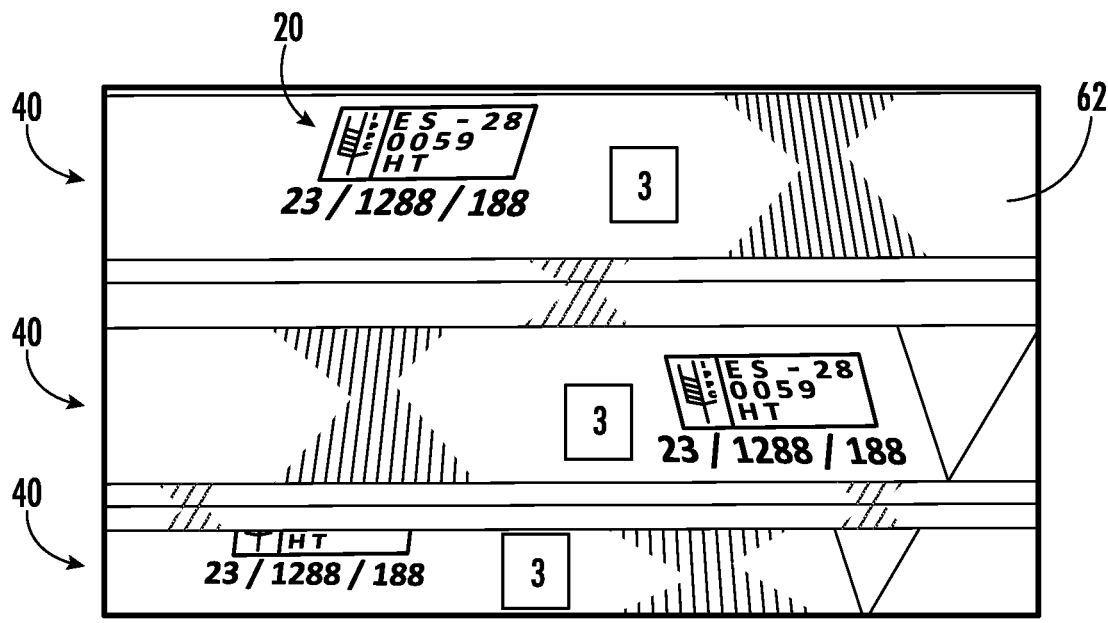
FIG. 5 is a partial upper perspective side view of stacked wooden pallets having heat treated markings on the outer bottom deck boards.
Figure 6:
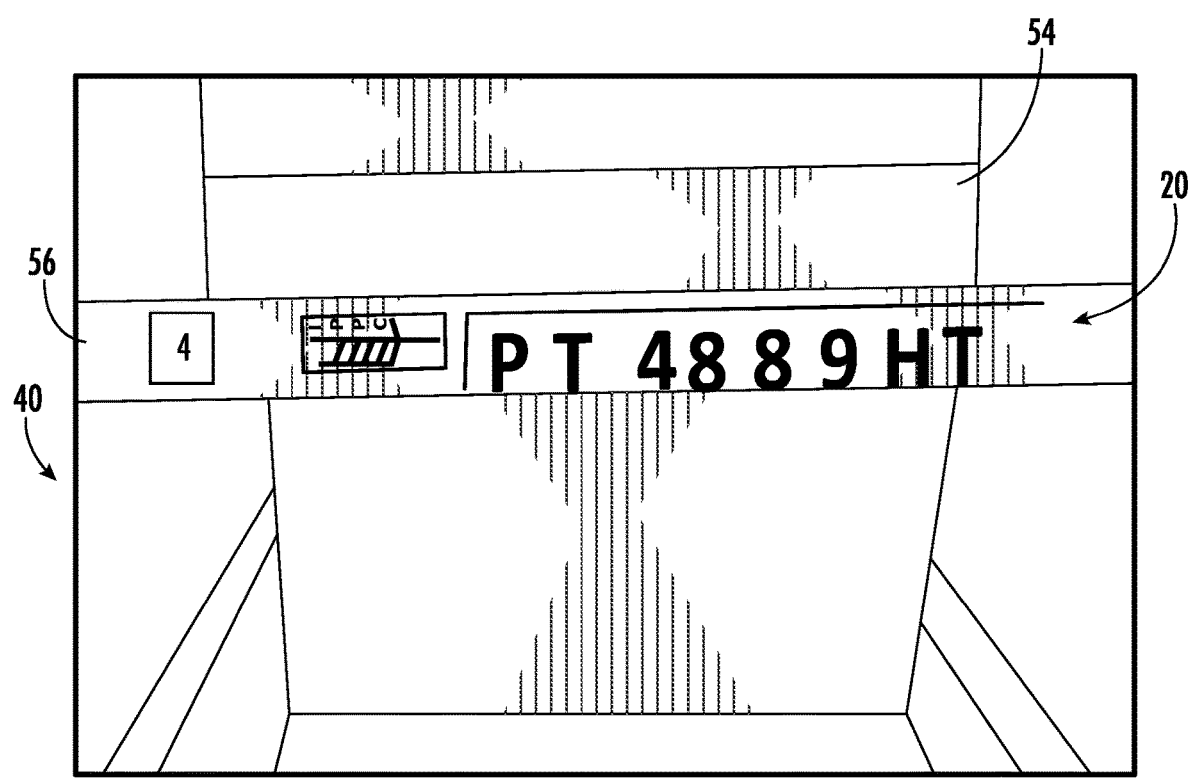
FIG. 6 is a partial side view of a wooden pallet having a heat treated marking on an outer edge of a connector board in the top deck.

A side view of stacked wooden pallets 40 having the ISPM15 marking 20 on the center support blocks 72 is illustrated in FIG. 4. An upper perspective view of stacked wooden pallets 40 having the ISPM15 marking 20 on the outer bottom deck boards 62 is illustrated in FIG. 5. A side view of a wooden pallet 40 having the ISPM15 marking 20 on an edge of a connector board 56 in the top deck 50 is illustrated in FIG. 6. When the ISPM15 marking 20 is on the edge of the connector board 56, the alphanumerics are positioned to fit on a single line.

Figure 7:
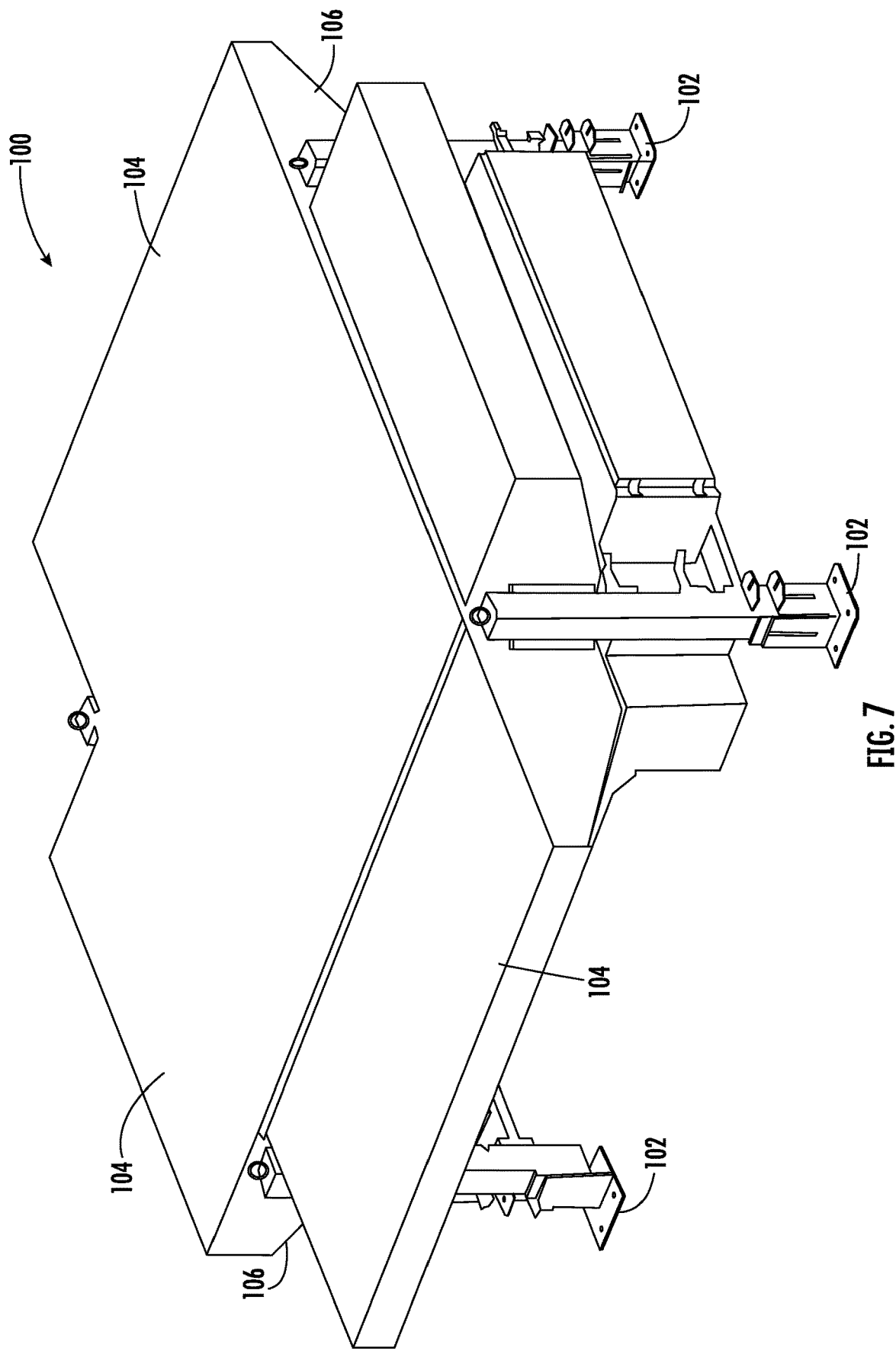
FIG. 7 is a perspective view of a fully enclosed pallet inspection system for inspecting wooden pallets for heat treated markings.
Figure 8:
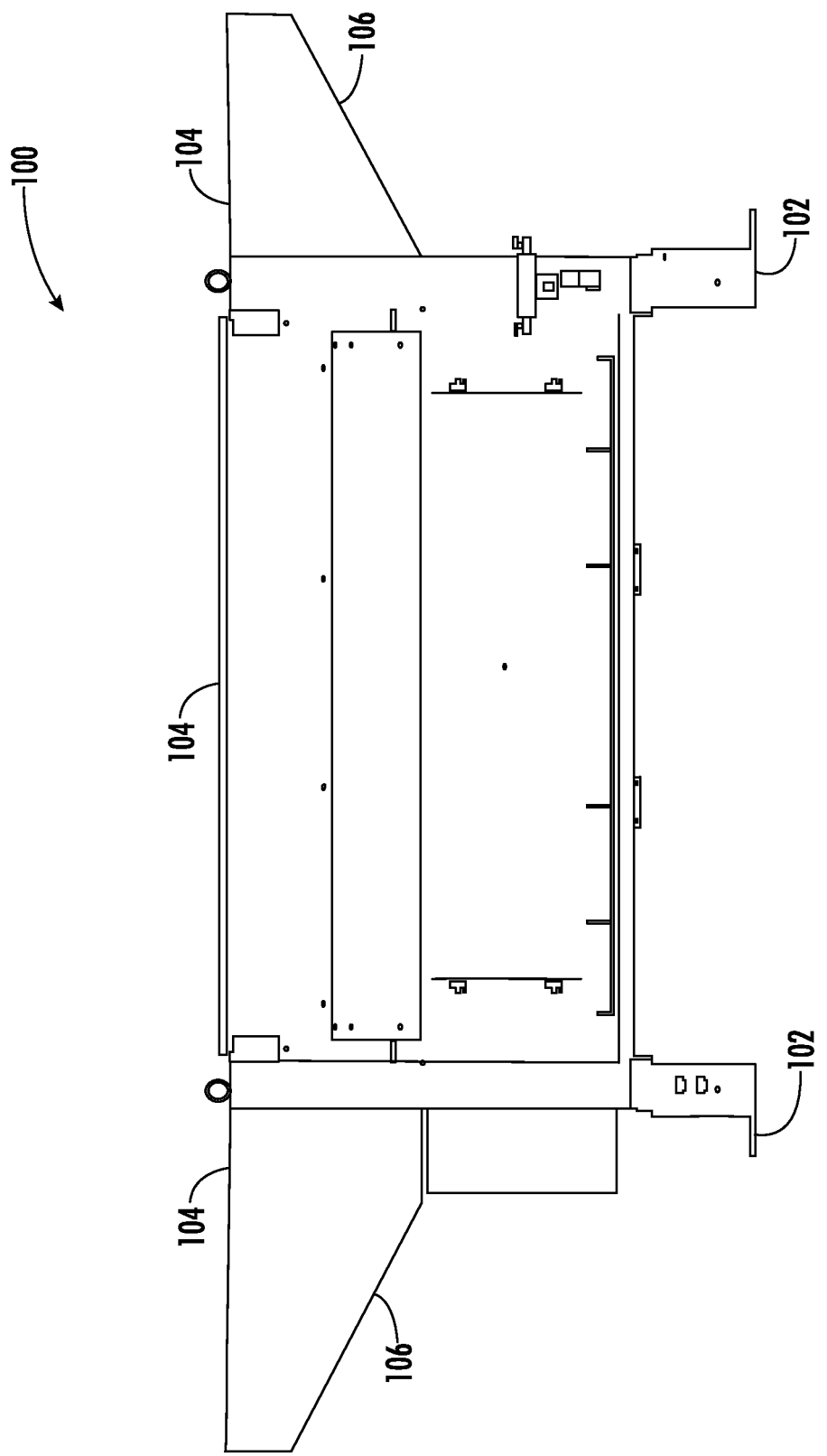
FIG. 8 is a perspective side view of the fully enclosed pallet inspection system illustrated in FIG. 7.
Figure 9:
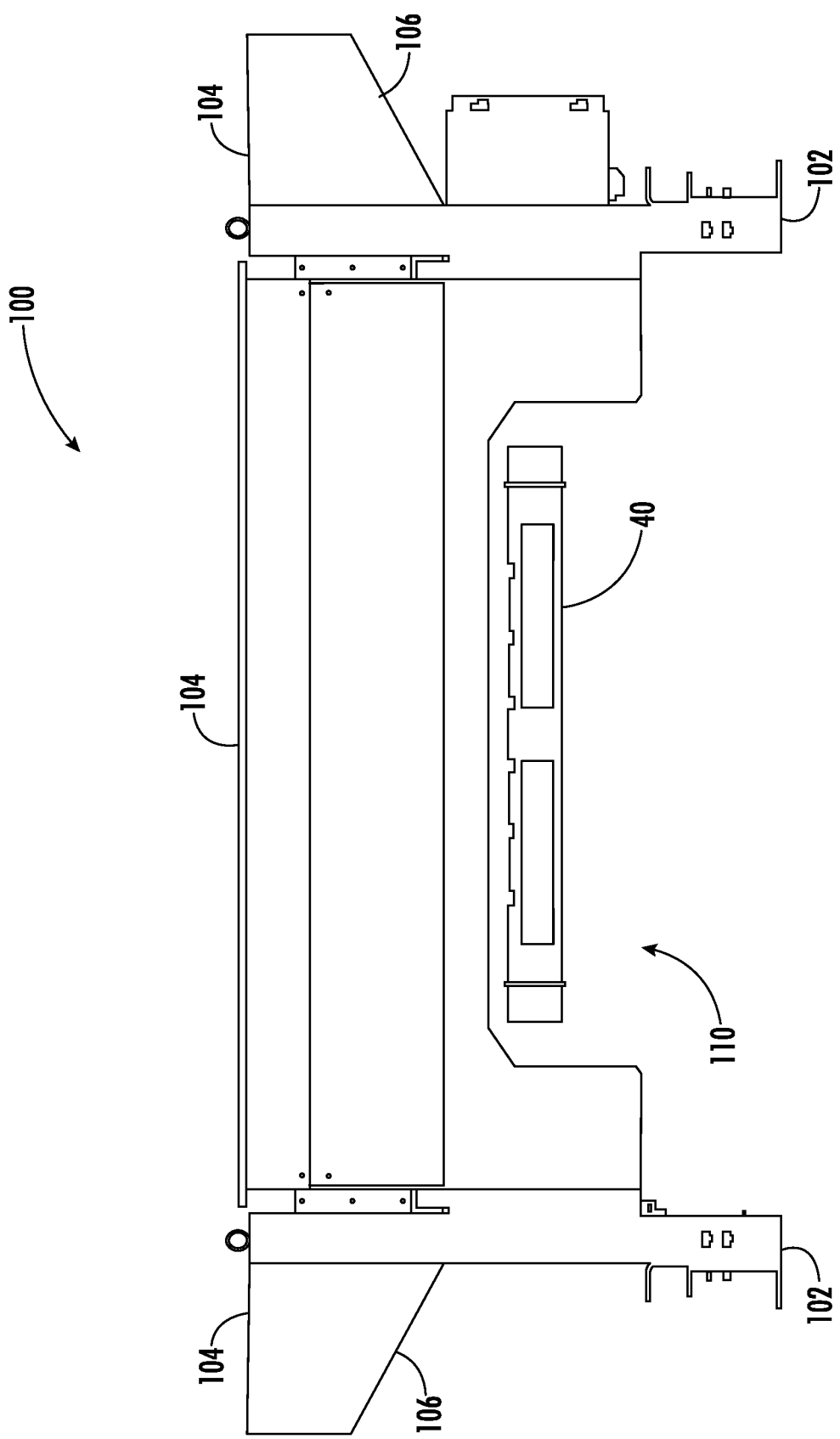
FIG. 9 is a perspective end view of the fully enclosed pallet inspection system illustrated in FIG. 7.

Referring now to FIGS. 7-9, a pallet inspection station 100 that is fully enclosed is configured to inspect wooded pallets 40 for ISPM15 markings 20. The pallet inspection station 100 includes a frame 102 with top and bottom covers 104, 106. The frame 102 is rectangular shape and has a pallet receiving area 110 as illustrated in FIG. 9. Although not illustrated, a conveyor may be used to transport the wooden pallet 40 through the pallet inspection station 100 for inspection.

Figure 10:
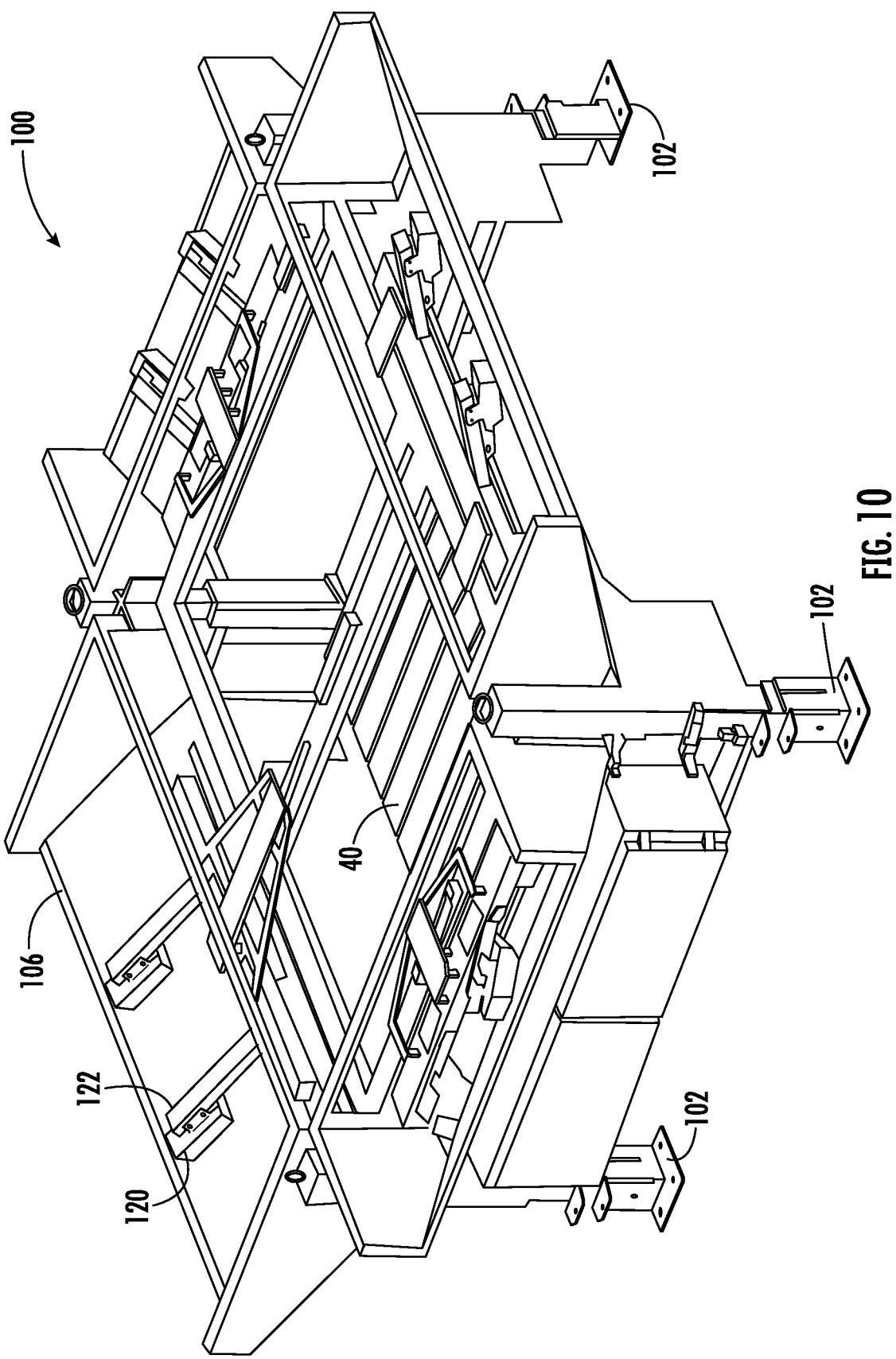
FIG. 10 is a perspective view of the pallet inspection system illustrated in FIG. 7 with the upper enclosures removed.
Figure 11:
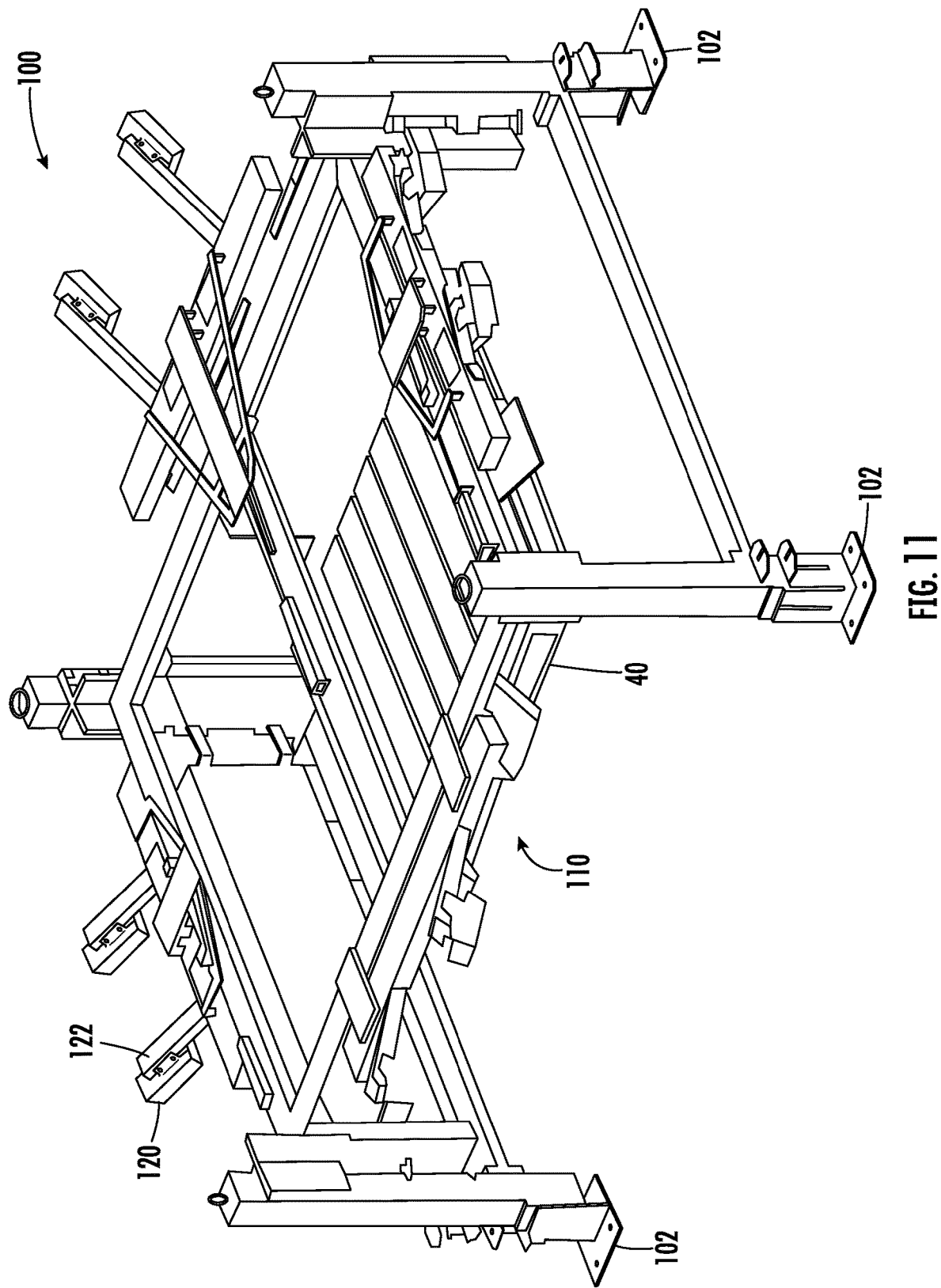
FIG. 11 is a perspective view of the pallet inspection system illustrated in FIG. 10 with the lower enclosure removed.
Figure 12:
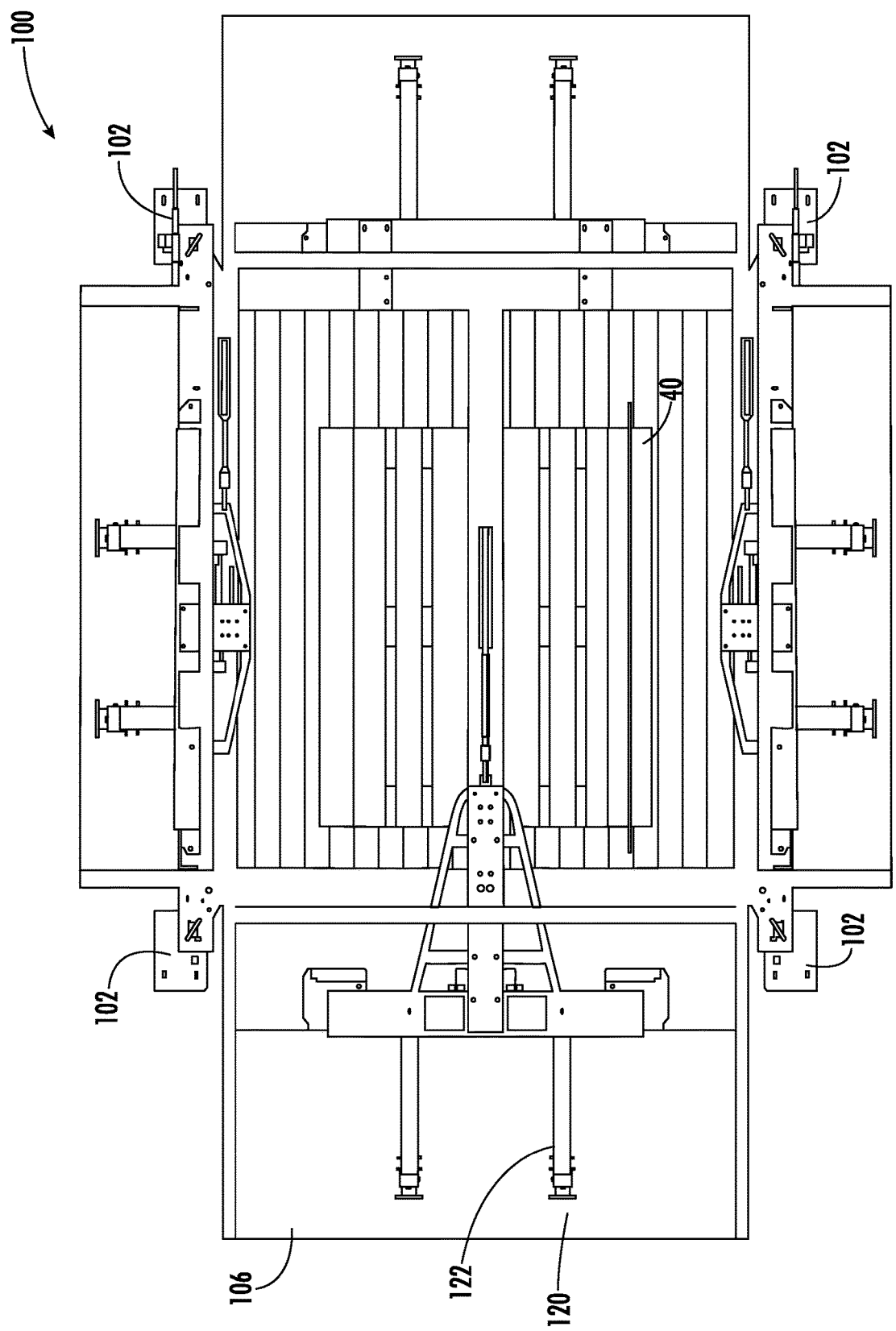
FIG. 12 is a top view of the pallet inspection system illustrated in FIG. 10.

Referring now to FIGS. 10 and 11, the top covers 104 have been removed to expose the cameras 120 and the pallet receiving area 110. In FIG. 12, both the top and bottom covers 104, 106 have been removed to expose the cameras 120 and the pallet receiving area 110. The cameras 120 are mounted to the frame 102 via camera arm extensions 122. Each camera arm extension 122 extends outwards and upwards from the frame 102 so that the cameras 120 look down at the wooden pallet 40 in the pallet receiving area 110. The cameras 120 are positioned within a range of 20 to 45 degrees with respect to the wooden pallet 40 in the pallet receiving area 110. Lights are also carried on each side of the frame 102 and are positioned to illuminate each side of the pallet 40 for the respective cameras 120.

In the illustrated embodiment, there are 8 cameras 120 total, with each side having 2 cameras 120. The cameras 120 may be color or monochrome. In another embodiment, there may be 4 cameras 120 total, with each side having 1 camera 120. In yet another embodiment, there may be more than 2 cameras 120 on each side.

The 8 cameras 120 are all triggered at the same time to generate images of the wooden pallet 40. When the wooden pallet 40 arrives in the pallet receiving area 110, movement of the wooden pallet 40 is stopped. After the wooden pallet 40 has been stopped by a stopper in the path of the pallet, then the 8 cameras 120 are triggered.

By having 2 cameras 120 on each side of the frame 102, a full or complete side view of the wooden pallet 40 is obtained for processing. The 2 cameras 120 on each side provide overlapping images since a single camera 120 cannot provide a full or complete side view of the wooden pallet 40.

As noted above in reference to FIG. 3, the ISPM15 markings 20 may be on different locations on a wooden pallet 40. For example, these locations include the center support blocks 72 as indicated by the boxed numbers 1 and 2, the outer bottom deck boards 62 as indicated by the boxed number 3, and on an outer edge of connector boards 56 in the top deck 50 as indicated by the boxed number 4.

Although not illustrated, the ISPM15 mark 20 may be on the corner support blocks 70, connector boards 56, and intermediate connector board 58. The bottom deck boards 62, 64 may also have the ISPM15 mark 20. In yet another example, the ISPM15 mark 20 may be on the upper surface of any of the boards in the top deck 50 or on the bottom surface of any of the boards in the bottom deck 60.

However, if the wooden pallets 40 being inspected are to have the ISPM15 marking 20 in the same location on each pallet, then 1 camera 120 per side may be used. In this case, each camera 120 is focused or positioned to view the same location on the side of the wooden pallet 40.

Figure 13A:
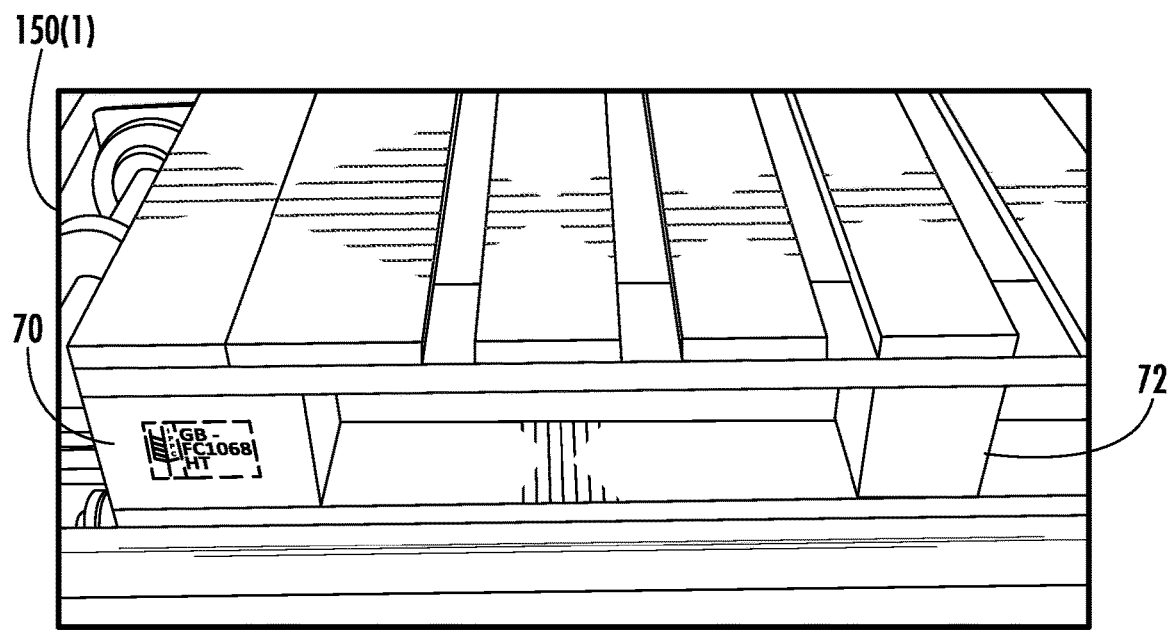
FIGS. 13a and 13b are partial views of one side of a wooden pallet being inspected by the pallet inspection system illustrated in FIG. 7.
Figure 13B:
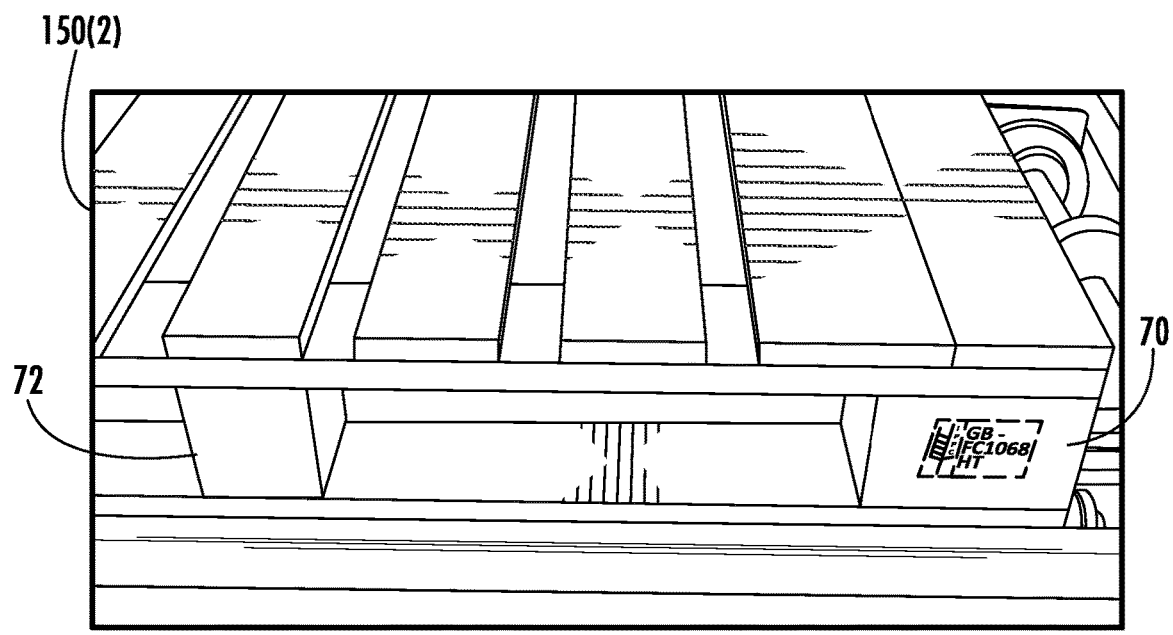

Since there are 8 cameras 120, 8 images are generated for inspection of a wooden pallet 40. Partial end views of one side of a wooden pallet 40 being inspected are provided in FIGS. 13a and 13b. This is the back end of the wooden pallet 40 as it travels through the pallet inspection station 100 on a conveyor. The image 150(1) in FIG. 13a includes the left outer support block 70 and the center support block 72. The image 150(2) in FIG. 13b includes the right outer support block 70 and the center support block 72. The images 150(1), 150(2) collectively provide a full side view of the wooden pallet 40, with the images overlapping at the center support block 72.

Figure 14A:
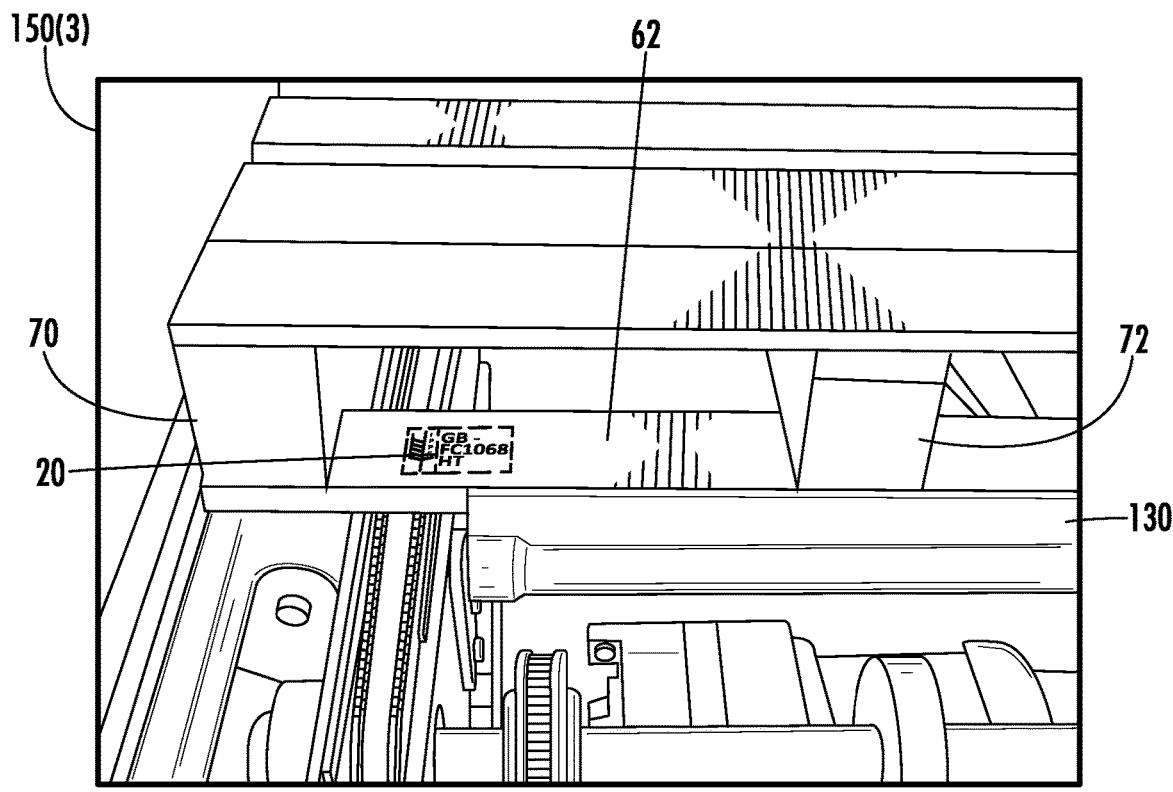
FIGS. 14a and 14b are partial views of the other side of the wooden pallet illustrated in FIGS. 13a and 13b.
Figure 14B:
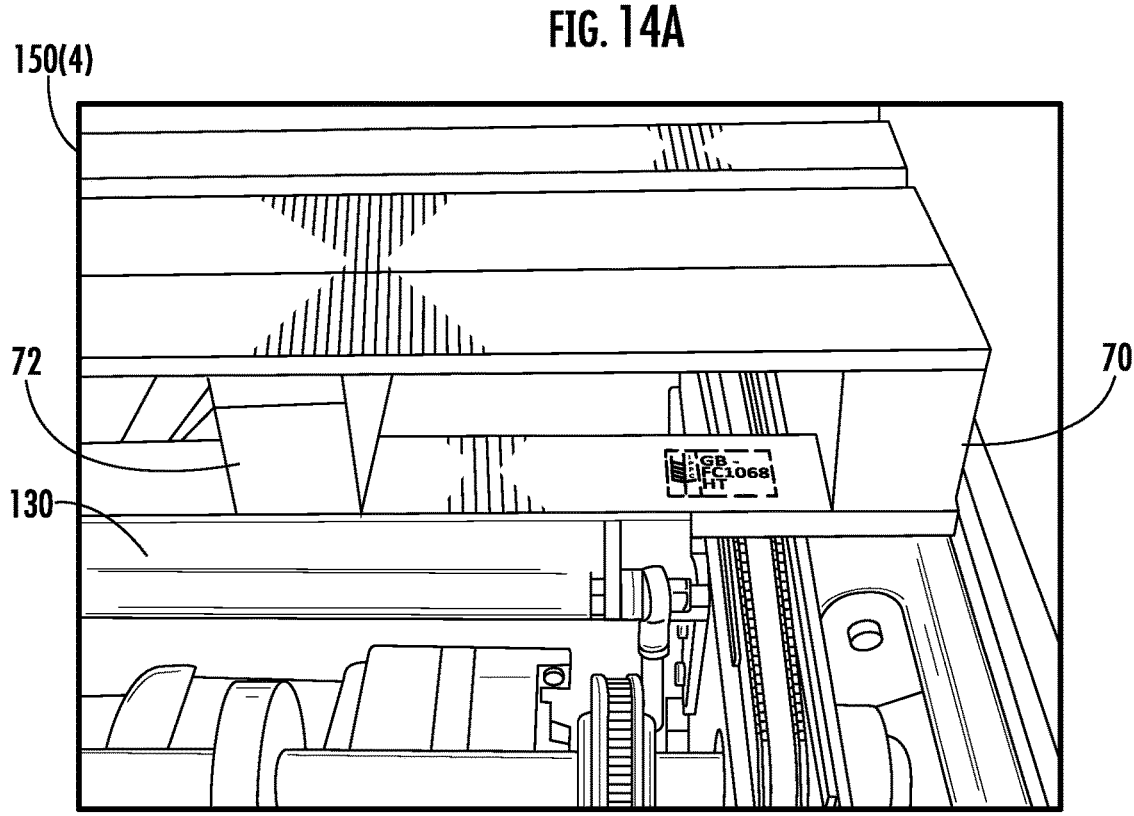

Partial end views of the other side of the wooden pallet 40 are provided in FIGS. 14a and 14b. This is the front end of the wooden pallet 40 as it travels through the pallet inspection station 100 on the conveyor. A stopper 130 is used to stop the wooden pallet 40 prior to the cameras 120 being activated. The image 150(3) in FIG. 14a includes the left outer support block 70 and the center support block 72. In this image 150(3), an ISPM15 mark 20 is on the outer bottom deck board 62. The image 150(4) in FIG. 14b includes the right outer support block 70 and the center support block 72.

Figure 15A:
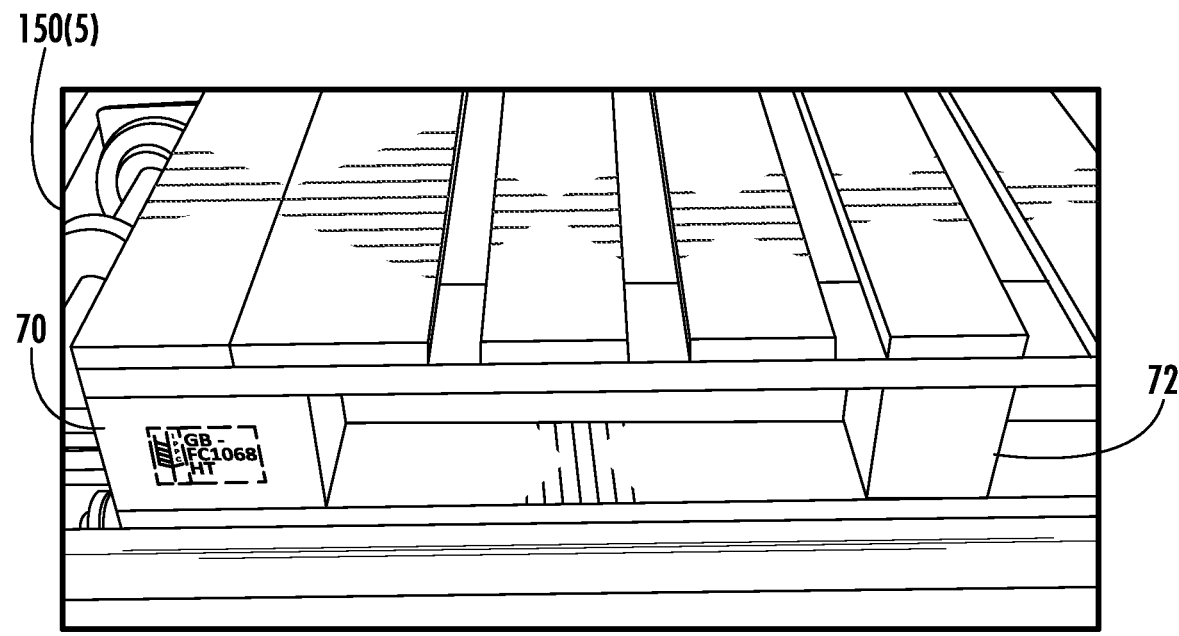
FIGS. 15a and 15b are partial views of one end of the wooden pallet illustrated in FIGS. 13a and 13b.
Figure 15B:
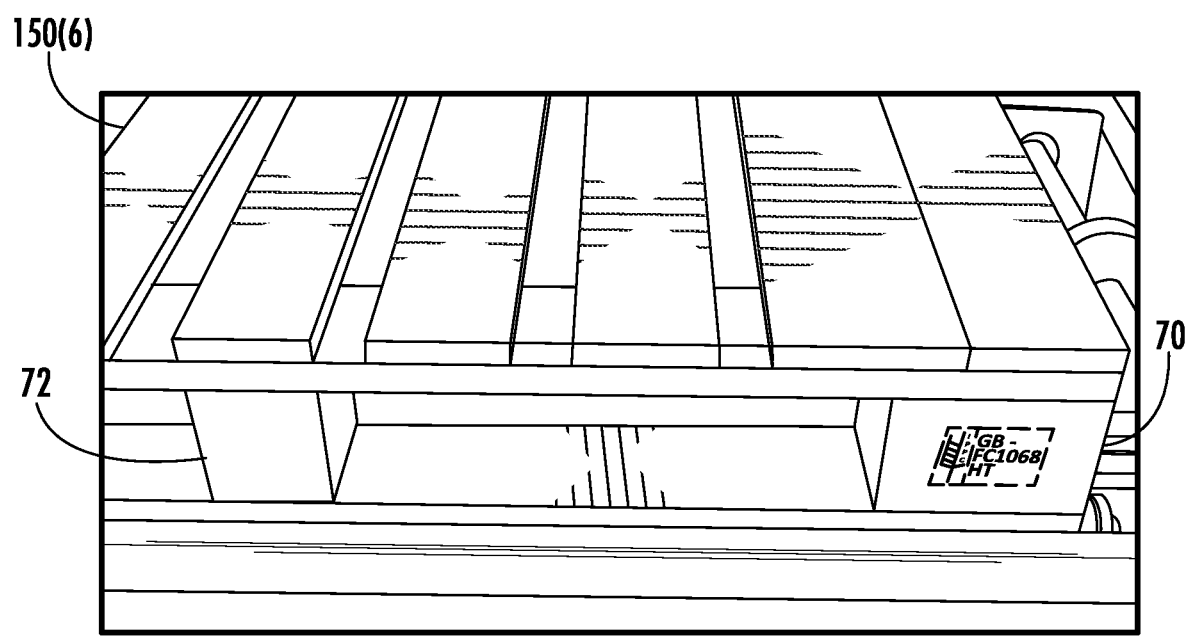

Partial side views of the left side of the wooden pallet 40 are provided in FIGS. 15a and 15b. The image 150(5) in FIG. 15a includes the left outer support block 70 and the center support block 72. The image 150(6) in FIG. 15b includes the right outer support block 70 and the center support block 72.

Figure 16A:
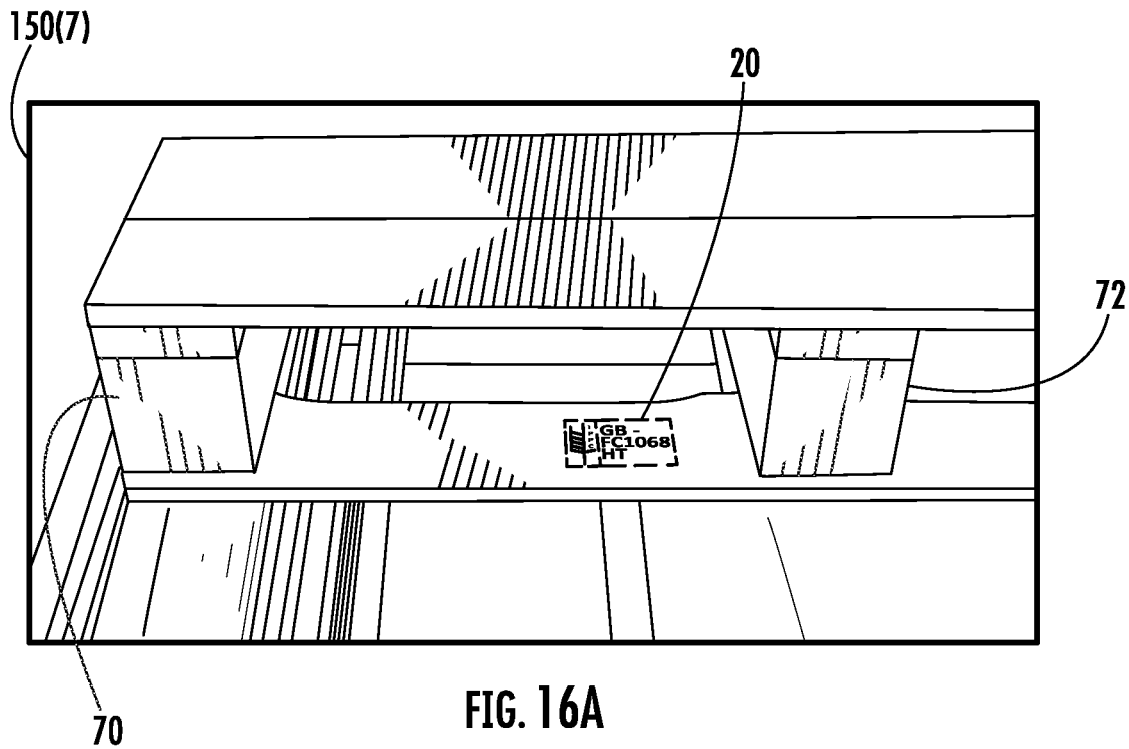
FIGS. 16a and 16b are partial views of the other end of the wooden pallet illustrated in FIGS. 13a and 13b.
Figure 16B:
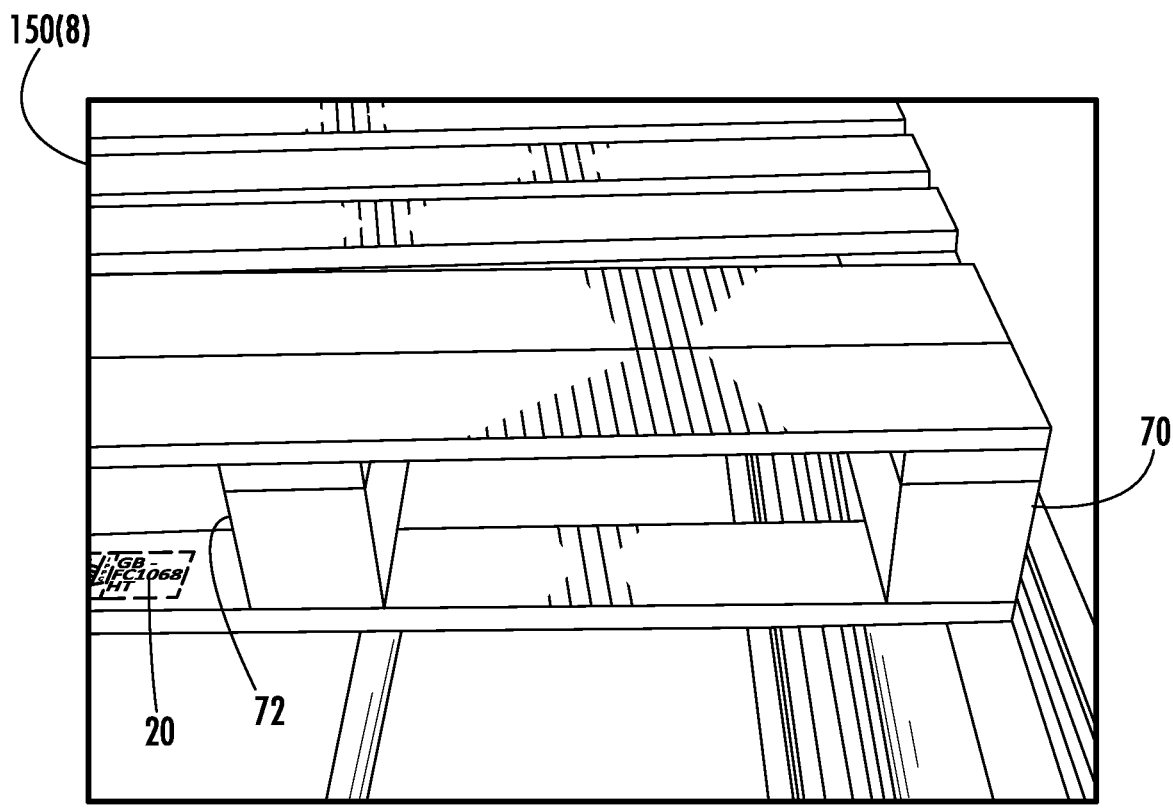

Partial side views of the right side of the wooden pallet 40 are provided in FIGS. 16a and 16b. The image 150(7) in FIG. 16a includes the left outer support block 70 and the center support block 72. In this image 150(7), an ISPM15 mark 20 is on the outer bottom deck board 62. The image 150(8) in FIG. 16b includes the right outer support block 70 and the center support block 72. The images 150(1)-150(8) will be generally referred to below as images 150.

Figure 17:
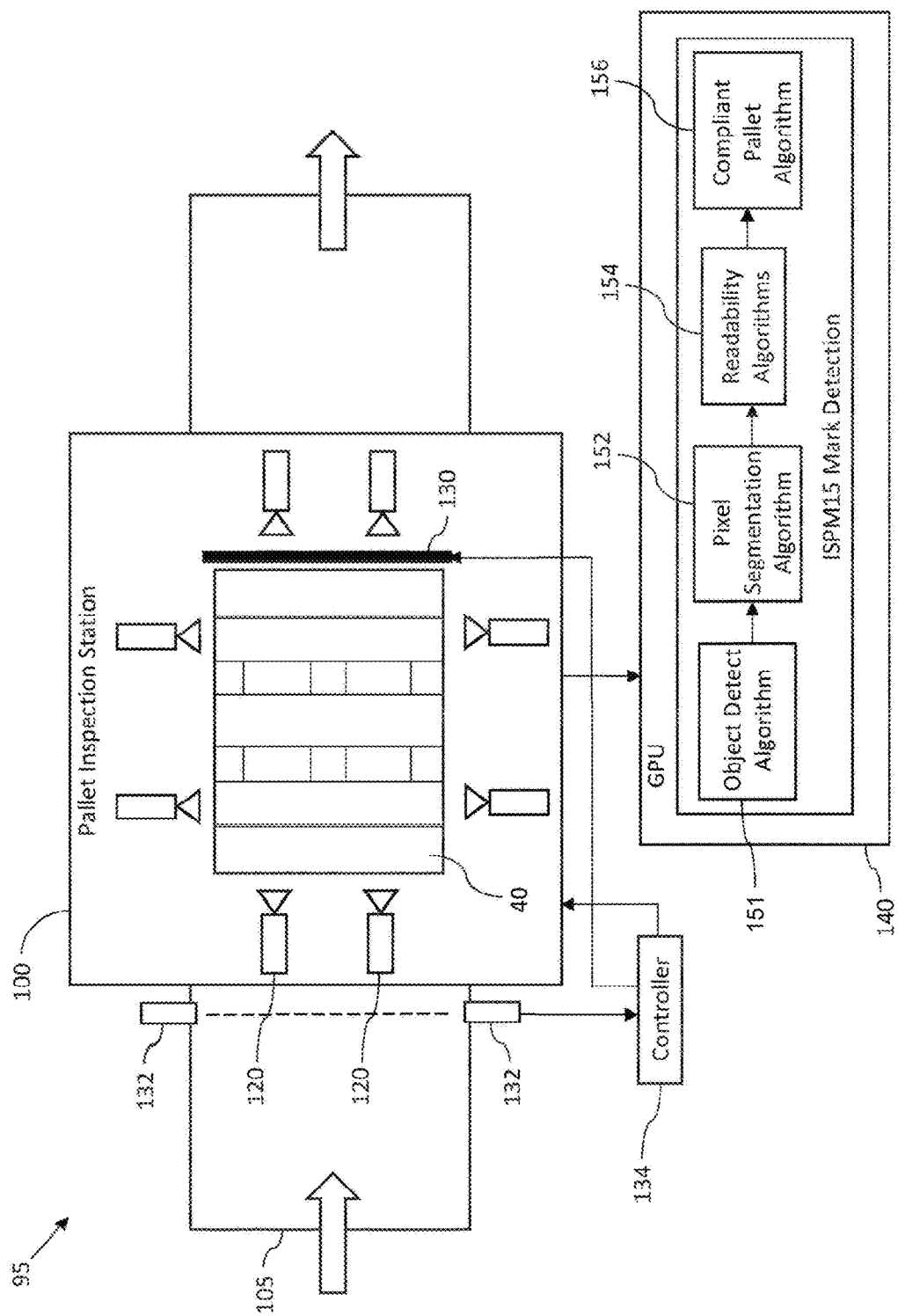
FIG. 17 is a block diagram of the pallet inspection system illustrated in FIG. 7.
Figure 18:
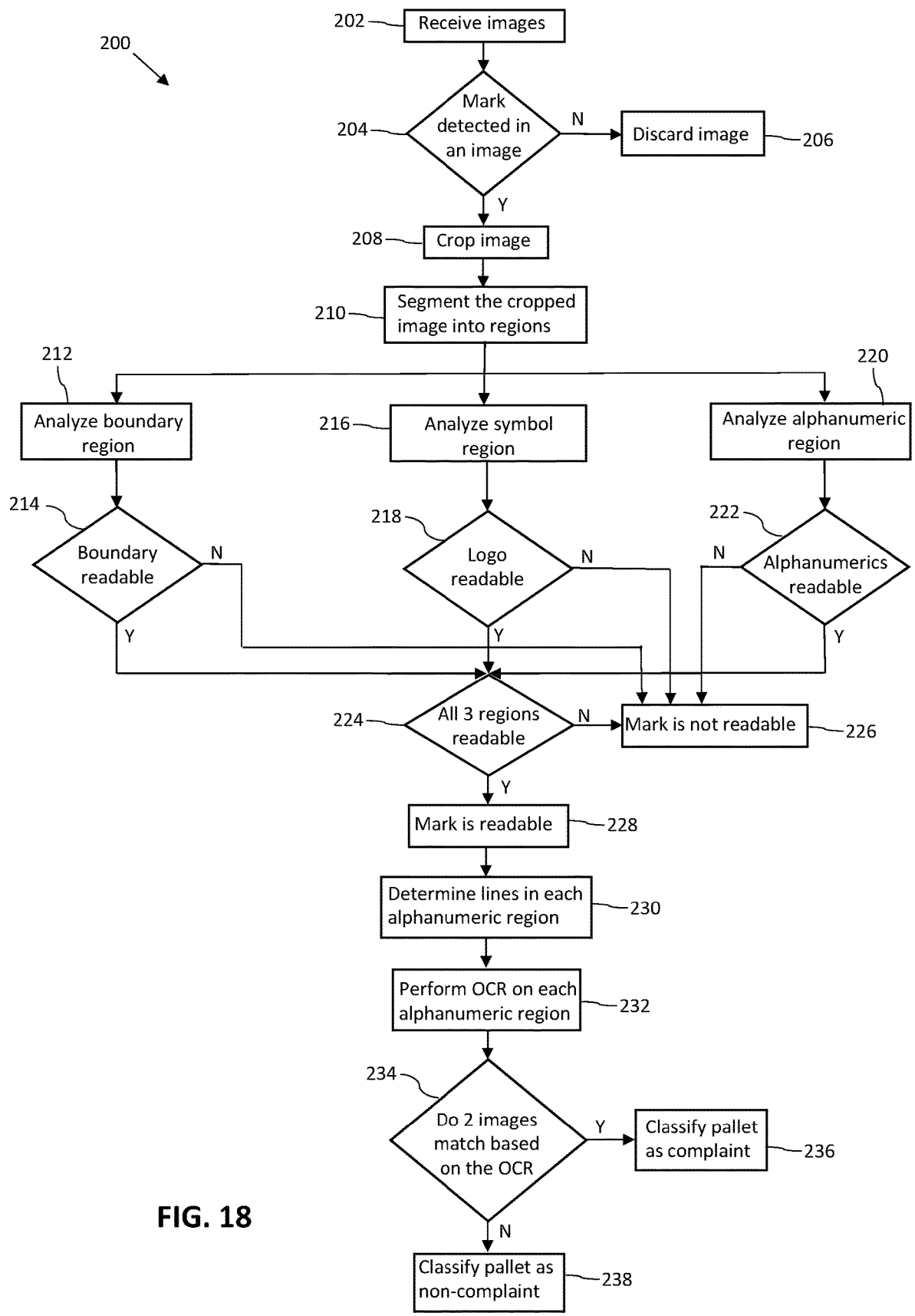
FIG. 18 is a flow diagram for detecting heat treated markings on a wooden pallet using the pallet inspection system illustrated in FIG. 17.

Operation of the pallet inspection station 100 for detecting ISPM15 markings 20 will now be discussed. A block diagram of a pallet inspection system 95 with the pallet inspection station 100 is provided in FIG. 17, and a flow diagram 200 for detecting ISPM15 markings 20 on a wooden pallet 40 using the pallet inspection system 95 is provided in FIG. 18.

A conveyor 105 moves the wooden pallet 40 through the pallet inspection station 100 in the direction of the illustrated arrows. The conveyor 105 includes a sensor 132 at the entrance of the pallet inspection station 100 to detect arrival of the wooden pallet 40. The sensor 132 is coupled to a controller 134.

The sensor 132 may be configured as photoelectric sensor, for example. The photoelectric sensor includes a transmitter and receiver on opposite sides of the conveyor 105. The transmitter transmits a light signal, which may be visible or infrared, to the receiver. The wooden pallet 40 is detected when the light beam is blocked from getting to the receiver from the transmitter.

Upon arrival of the wooden pallet 40, the controller 134 activates a stopper 130 in the path of the wooden pallet 40. When activated, the stopper 130 is raised through gaps in the conveyor 105 to stop the pallet in a set location with respect to the cameras 120. After the wooden pallet 40 is stopped by the stopper 132, the controller 134 activates or triggers the cameras 120 to generate images 150 of the wooden pallet 40.

The images 150 are sent to a processing unit 140 for processing. The processing unit 140 executes different machine learning algorithms, as will be discussed in greater detail below. The processing unit 140 may be a graphics processing unit (GPU), a central processing unit (CPU) or an edge computing device, for example.

In the flow diagram 200, the generated images 150 of the wooden pallet 40 being inspected are received at Block 202. The GPU 140 executes an object detection algorithm 151 at Block 204 that has been trained to locate an ISPM15 mark 20 within an image 150.

The object detect algorithm 151 may operate based on artificial intelligence (AI) and machine learning (ML) to determine ISPM15 marks 20 within the images 150. The object detect algorithm 151 is trained using annotated images that include different locations of where an ISPM15 mark 20 may be located. In the annotated images, bounding boxes are used to mark the different locations of an ISPM15 mark 20.

In other embodiments, a segmentation algorithm may be used instead of the object detect algorithm 151. A segmentation algorithm partitions an image into sets of pixels or regions. The purpose of partitioning is to understand better what the image represents. The sets of pixels may represent objects in the image that are of interest for a specific application, such as detecting an ISPM15 mark 20. Instead of object detection, direct segmentation may be used to crop the image to be processed by the segmentation algorithm.

Figure 19:
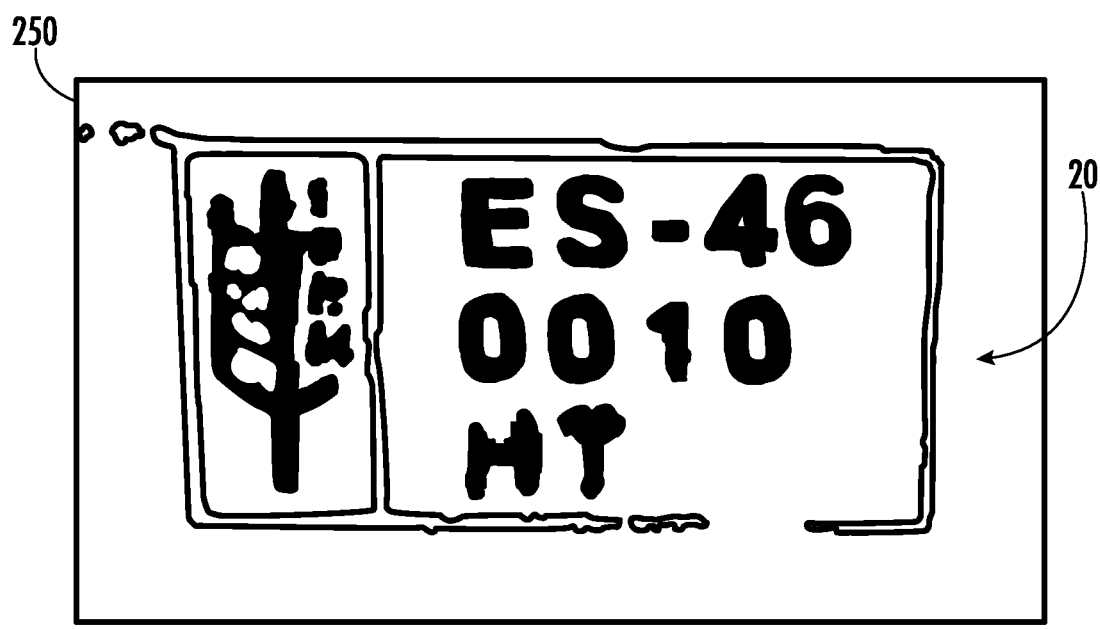
FIG. 19 is a cropped image of a heat treated marking on a wooden pallet.

At Block 204, if an image 150 does not have an ISPM15 mark 20, then the image is discarded at Block 206. If the image 150 has an ISPM15 mark 20, then the image 150 is cropped at Block 208. In the cropped image 250, the ISPM15 mark 20 is cropped so that the area surrounding the ISPM15 mark 20 within the image 150 is removed, as illustrated in FIG. 19.

The cropped image 250 is then passed to a pixel segmentation algorithm 152 at Block 210. Image segmentation is the process of classifying or assigning a label to every pixel in the cropped image 250 such that pixels with the same classification identifier share certain characteristics. The pixel segmentation algorithm 152 may operate based on artificial intelligence (AI) and machine learning (ML).

The cropped image 250 is segmented into a boundary region 25, a symbol region 29 and an alphanumeric region 31, as discussed above and as illustrated in FIG. 1. The pixels in the boundary region 25 may have the number 1 assigned as a classification identifier. The pixels in the symbol region 29 may have the number 2 assigned as a classification identifier. The pixels in the alphanumeric region 31 may have the number 3 assigned as a classification identifier. A fourth region will be a background region for the pixels that fall outside of the boundary region 25, the symbol region 29 and the alphanumeric region 31. The pixels in the background region may have the number 4 assigned as a classification identifier.

Outputs of the pixel segmentation algorithm 152 are provided to respective readability algorithms 154. The respective readability algorithms 154 may operate based on artificial intelligence (AI) and machine learning (ML). The readability algorithms 154 analyze the regions based on readability criteria associated with each respective region. The readability criteria is used to determine if each respective region is legible enough to be read and understood by a person. The readability algorithms 154 do not read the regions.

The readability algorithms 154 include a first readability algorithm 154 for the boundary region 25, a second readability algorithm 154 for the symbol region 29, and a third readability algorithm 154 for the alphanumeric region 25. The readability algorithms 154 are executed by a processor at the same time. That is, the different regions are analyzed at the same time by their respective readability algorithm 154.

Figure 20:
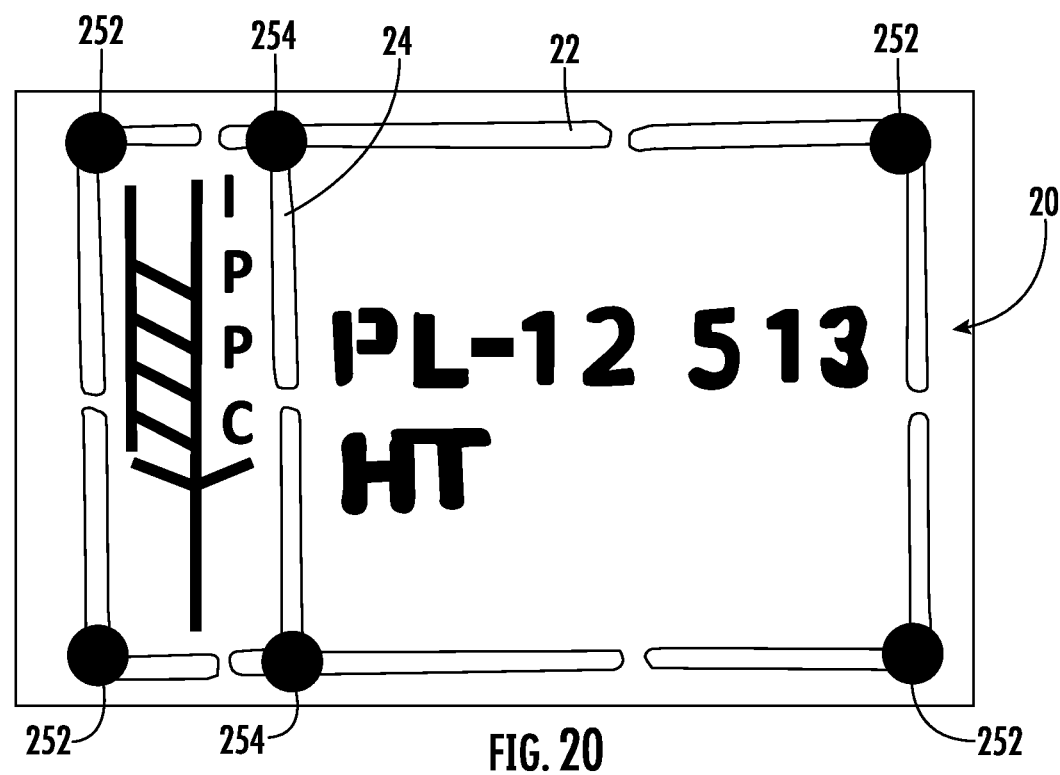
FIG. 20 is an image of corner point detection being performed for the boundary region of a heat treated marking.

The first readability algorithm 154 is used to analyze the boundary region 25 at Block 212. The first readability algorithm 154 is trained to perform corner point detection to detect corner points, as illustrated in FIG. 20. Corner points 252 are detected for the external perimeter 22, and corner points 254 are detected for the divider line 24. The pixels between the detected corner points 252, 254 are sampled, and a number of the sampled pixels having the same classification identifier 1 is determined.

The boundary region 25 is identified in Block 214 as being readable based on the determined number of sampled pixels having the same classification identifier 1 exceeding a boundary region threshold. The boundary region threshold includes a threshold for the external perimeter 22, and a threshold for the divider line 24.

The respective thresholds correspond to a percentage of the sampled pixels being resent. For example, the threshold for the external perimeter 22 may within a range of 70% to 100%, and the threshold for the divider line 24 may within a range of 95% to 100%. If the boundary region 25 is not readable, then the image 150 is discarded at Block 226. If the boundary region 25 is readable, then the process continues to Block 224.

Figure 21:
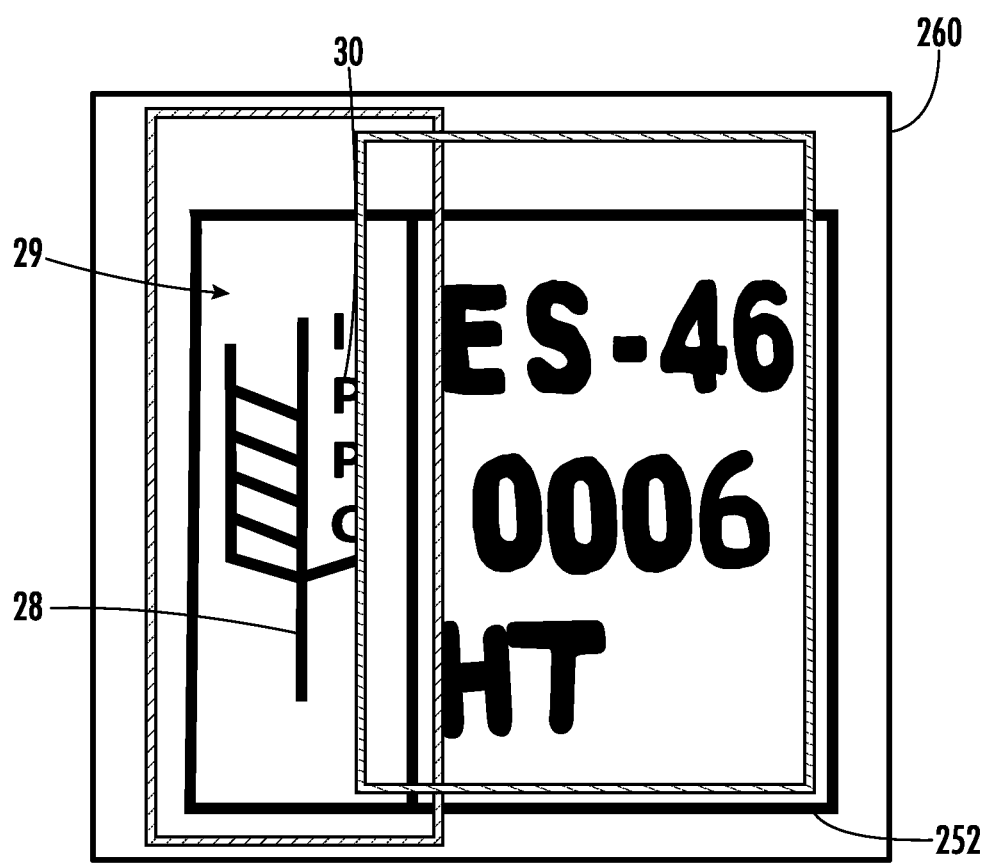
FIG. 21 is an image of a symbol region of a heat treated marking being analyzed.

The second readability algorithm 154 is used to analyze the symbol region 29 at Block 216. The second readability algorithm 154 is trained to analyze the pixels in the tree 28, and the pixels forming the IPPC letters 30 adjacent the tree, as illustrated by the image 260 in FIG. 21. Pixels within the tree 28 are sampled, and pixels within the IPPC letters 30 are sampled. A number of the sampled pixels having the same classification identifier 2 is determined.

The symbol region 29 is identified in Block 218 as being readable based on the determined number of sampled pixels having the same classification identifier 2 exceeding a symbol region threshold. The symbol region threshold includes a threshold for the tree 28, and a threshold for the IPPC letters 30.

The respective thresholds correspond to a percentage of the sampled pixels being present. For example, the threshold for the tree 28 may within a range of 75% to 100%, and the threshold for the IPPC letters 30 may also be within a range of 75% to 100%. The readability criteria associated with the IPPC letters 30 may be such that the IPPC letters 30 are visible but not necessarily legible. If only one of the IPPC letters is not visible, then the IPPC letters 30 is considered to be readable. If the symbol region 29 is not readable, then the image 150 is discarded at Block 226. If the symbol region 29 is readable, then the process continues to Block 224.

The third readability algorithm 154 is used to analyze the alphanumeric region 31 at Block 220. The third readability algorithm 154 is trained to analyze the pixels in the alphanumeric characters within the alphanumeric region 31. Pixels within the alphanumeric region 31 having the same classification identifier 3 are identified.

Figure 22:
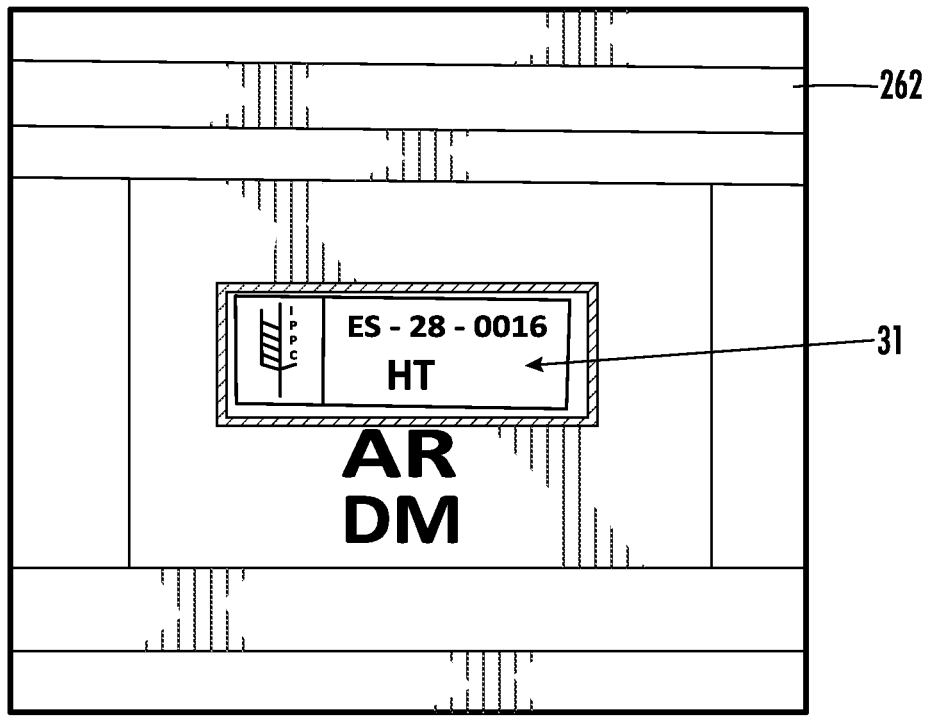
FIG. 22 is an image of alphanumeric characters that are readable within a symbol region of a heat treated marking.
Figure 23:
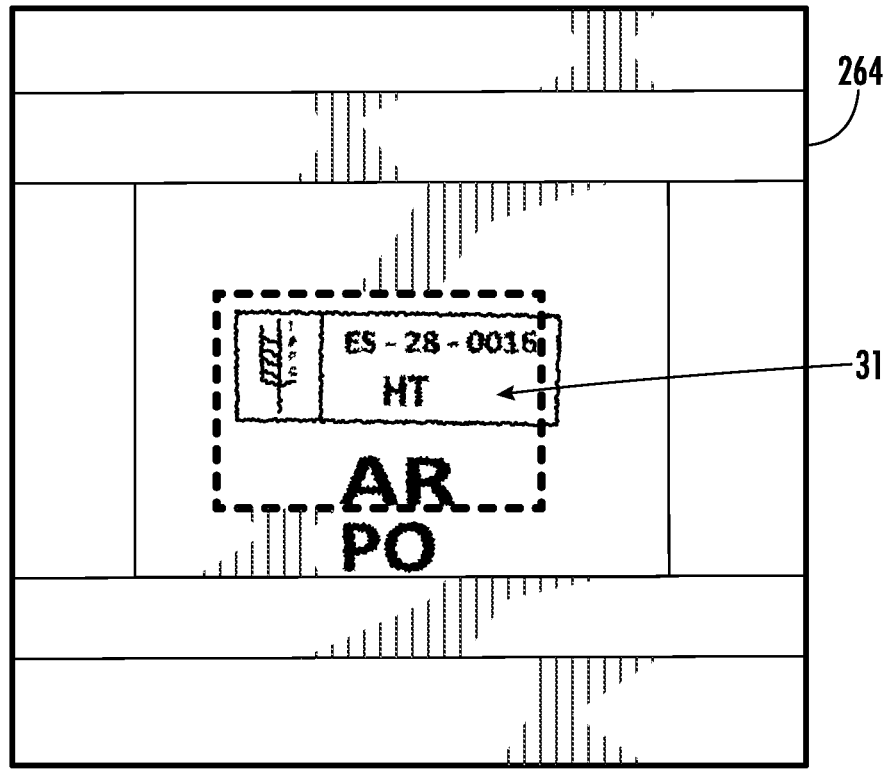
FIG. 23 is an image of alphanumeric characters that are not readable within a symbol region of a heat treated marking.

A readability score is determined for the identified pixels, with the readability score being selected within a readability scoring range. The readability scoring range may vary between 1 to 5, for example. A 5 may correspond to all of the alphanumeric characters being readable, as illustrated by the image 262 in FIG. 22. A 1 may correspond to hardly any of the alphanumeric characters being visible, as illustrated by the image 264 in FIG. 23.

A 4 may correspond to one of the alphanumeric characters being partially visible but the alphanumeric character is still known. A 3 may correspond to one of the alphanumeric characters not being visible or missing, and a 2 may correspond to two or more alphanumeric characters not being visible or missing.

The use of a readability scoring range provides flexibility to the third readability algorithm 154 in determining readability of the alphanumeric characters. Instead of the decision being binary, as was the case using the first and second readability algorithms 154, 154, the third readability algorithm 154 allows for flexibility in making the determination. When the determination falls in the middle of the readability scoring range (i.e., 2 through 4), a sliding scale allows for a more general determination to be made on readability of the alphanumeric characters.

The alphanumeric region 31 is identified in Block 222 as being readable based on the readability score exceeding a readability score threshold. The readability score threshold may be 3.5, for example. If the alphanumeric region 31 is not readable, then the image 150 is discarded at Block 226. If the alphanumeric region 31 is readable, then the process continues to Block 224.

As an alternative to analyzing the symbol region 29 using the second readability algorithm 154, the third readability algorithm 154 may be configured to analyze the symbol region 29. That is, the readability criteria of the symbol region 29 would be based on a readability scale similar to the readability scale as discussed for the alphanumeric region 31.

For the ISPM15 mark 20 to be readable, each of the boundary region 25, the symbol region 29 and the alphanumeric region 31 needs to be readable. If one of the three regions is not readable, then the ISPM15 mark 20 is classified as not readable in Block 226. If all three regions are readable, then the ISPM15 mark 20 is classified as readable and the process continues to Block 228.

After the ISPM15 marks 20 have been identified as readable in the received images 150, the next step in the process is to determine if the wooden pallet 40 is compliant. This determination is based on morphology. For the wooden pallet 40 to be compliant, there needs to be a pair of matching ISPM15 marks 20. If there is only one ISPM15 mark 20 or if the alphanumeric characters in the two ISPM15 marks 20 do not match one another, then the wooden pallet 40 is classified as non-compliant.

Figure 24:
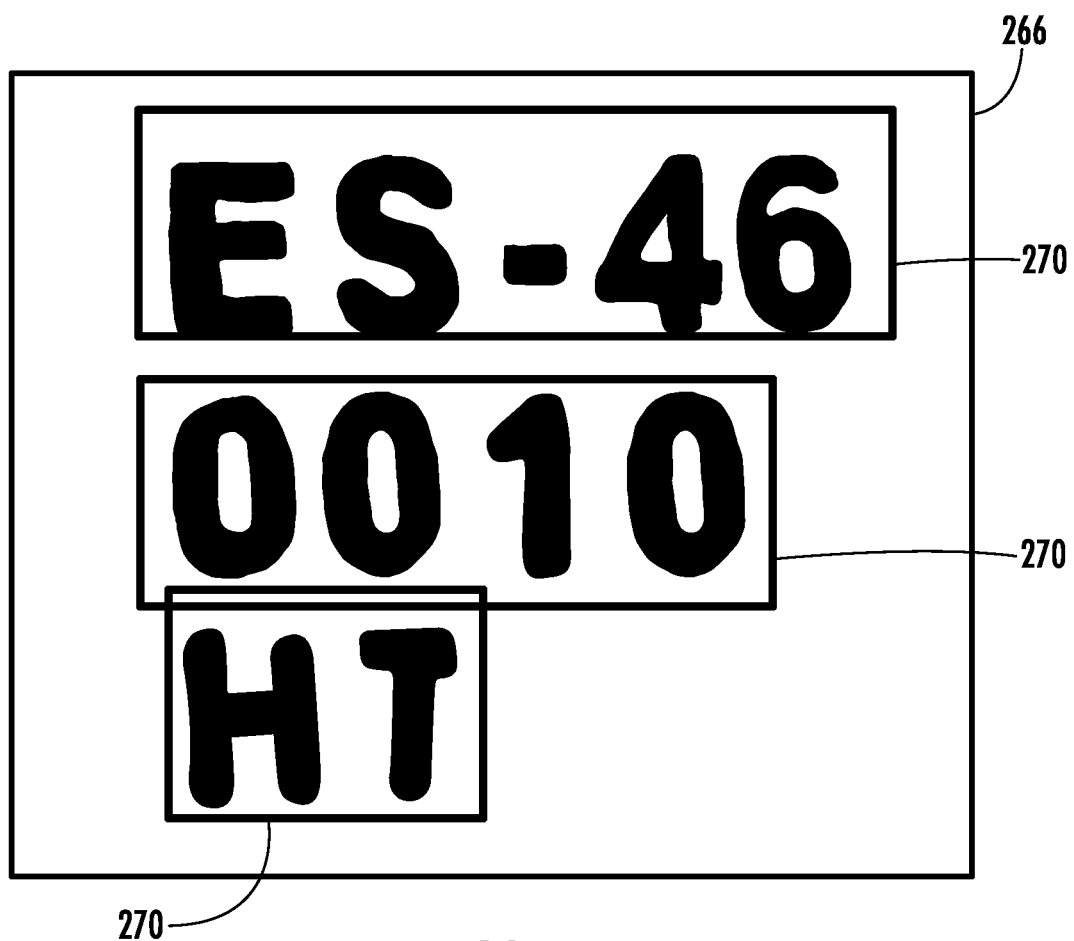
FIG. 24 is an image of line detection being performed for the alphanumeric characters within a symbol region of a heat treated marking.

A compliant pallet algorithm 156 is used to determine if the wooden pallet 40 has a pair of matching ISPM15 marks 20. The compliant pallet algorithm 156 first detects lines 270 within the alphanumeric region 31 for each ISPM15 mark 20 at Block 230, as illustrated by the image 266 in FIG. 24. There are 3 lines 270 in the alphanumeric region 31, with each line 270 including alphanumeric characters.

Figure 25:
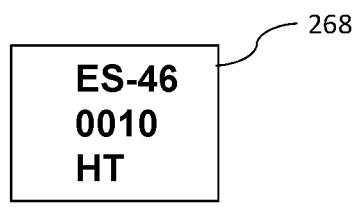
FIG. 25 is a display image of the alphanumeric characters within an alphanumeric region of a heat treated marking that have been read using optical character recognition.
Figure 26:
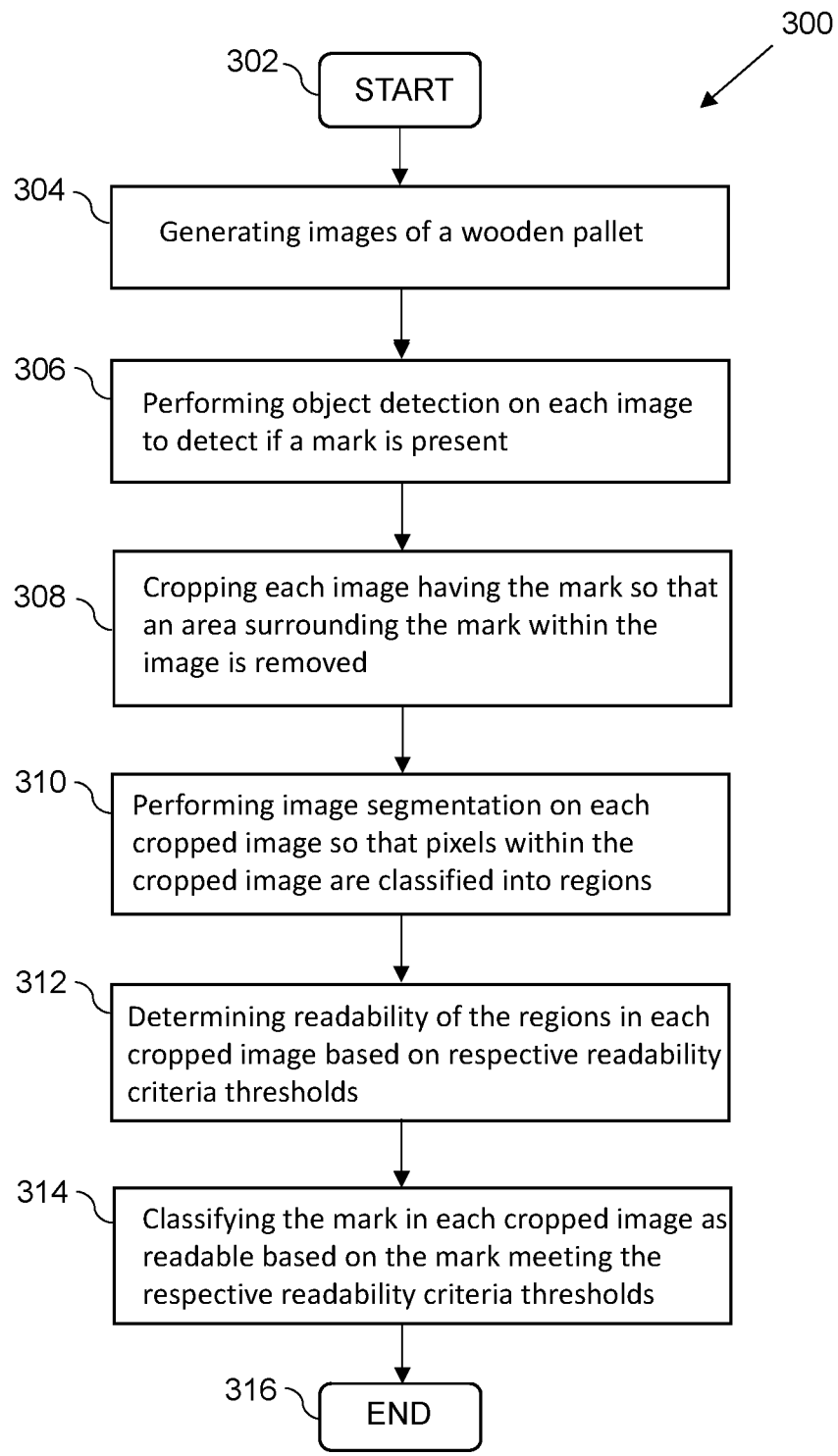
FIG. 26 is a flow diagram for operating the pallet inspection system illustrated in FIG. 17.

After the lines 270 have been detected, then optical character recognition (OCR) is performed at Block 232 to read the alphanumeric characters in each line, as illustrated in display 268 in FIG. 25. A determination is made at Block 234 on if the alphanumeric characters within the pair of ISPM15 marks 20 match one another.

If the alphanumeric characters match, then the wooden pallet 40 is classified as compliant in Block 236. If the alphanumeric characters do not match, then the wooden pallet 40 is classified as non-compliant in Block 238. In other embodiments of the processing unit 140 receiving the images for processing, the processing unit 140 may not crop each image. Instead, the mark is detected using object detection, and readability is then determined in order to classify the mark. Based on the mark meeting the respective readability criteria thresholds, the mark is classified.

Another aspect is directed to a method for operating the pallet inspection system 95 as described above. Referring now to the flow diagram 300 in FIG. 25, from the start (Block 302), the method includes generating images 150 of the wooden pallet 40 at Block 304, and performing object detection on each image 150 at Block 306 to detect if an ISPM15 mark 20 is present. Each image 150 having the ISPM15 mark 20 is cropped at Block 308 so that an area surrounding the mark within the image is removed.

Image segmentation is performed on each cropped image 250 at Block 310 so that pixels within the cropped image 250 are classified into regions. Readability of the regions in each cropped image 250 is determined at Block 312 based on respective readability criteria thresholds. The ISPM15 mark 20 in each cropped image 250 is classified at Block 314 as readable based on the ISPM15 mark 20 meeting the respective readability criteria thresholds. The method ends at Block 316.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A pallet inspection system comprising:
a rectangular-shaped frame configured to have a pallet receiving area to receive a wooden pallet to be inspected for having at least one mark indicating that wood in the pallet has been heat treated;
a plurality of cameras carried by said frame to generate a plurality of images of the wooden pallet in response to the wooden pallet being in the pallet receiving area; and
one or more processors coupled to said plurality of cameras and configured to receive the plurality of images for processing, the processing comprising:
performing object detection on each of the plurality of images to detect if the mark is present,
cropping each image having the mark so that an area surrounding the mark within the image is removed,
performing image segmentation on each cropped image so that pixels within the cropped image are classified into regions,
determining readability of the regions in each cropped image based on respective readability criteria thresholds,
classifying the mark in each cropped image as readable based on the mark meeting the respective readability criteria thresholds, and
in response to a classification of a mark pair as readable,
  (i) reading a first set of alphanumeric characters from a first mark of the mark pair,
  (ii) reading a second set of alphanumeric characters from a second mark of the mark pair, and
  (iii) classifying the wooden pallet as being compliant in response to a match between the first set of alphanumeric characters and the second set of alphanumeric characters.

2. The pallet inspection system according to claim 1 wherein the classified regions for each cropped image comprise a boundary region, a symbol region, and an alphanumeric region, with the pixels in each region having respective classification identifier associated therewith.

3. The pallet inspection system according to claim 2 wherein the boundary region has a rectangular shape with first and second opposing sides, and a divider line extending between one of opposing sides, with the symbol region and the alphanumeric region being enclosed by the boundary region and separated by the divider line.

4. The pallet inspection system according to claim 1 wherein the classified regions comprise a boundary region having a classification identifier associated therewith, and wherein determining readability of the boundary region comprises the following:
perform corner point detection to detect corner points;
sample the pixels between the detected corner points;
determine a number of the sampled pixels having the same classification identifier; and
identify the boundary region as being readable based on the determined number of sampled pixels having the same classification identifier exceeding a boundary region threshold.

5. The pallet inspection system according to claim 1 wherein the classified regions comprise a symbol region having a classification identifier associated therewith, and wherein determining readability of the symbol region comprises the following:
sample the pixels within the symbol region;
determine a number of the sampled pixels having the same classification identifier; and
identify the symbol region as being readable based on the determined number of sampled pixels having the same classification identifier exceeding a symbol region threshold.

6. The pallet inspection system according to claim 1 wherein the classified regions comprise an alphanumeric region having a classification identifier associated therewith, and wherein determining readability of the alphanumeric region comprises the following:
identify the pixels within the alphanumeric region having the same classification identifier;
determine a readability score for the identified pixels, with the readability score being selected within a readability scoring range; and
identify the alphanumeric region as being readable based on the readability score exceeding a readability score threshold.

7. The pallet inspection system according to claim 1 wherein the classified regions comprise an alphanumeric region having alphanumeric characters, and wherein said processor is further configured to perform the following for each mark classified as readable:
detect lines within the alphanumeric region, with each line including the alphanumeric characters; and
perform optical character recognition to read the alphanumeric characters in each line.

8. The pallet inspection system according to claim 1 wherein said plurality of cameras are positioned so that each side of the pallet receiving area has a single camera focused on a portion of a side view of the wooden pallet where the mark is expected to be located.

9. The pallet inspection system according to claim 1 wherein said plurality of cameras are positioned so that each side of the pallet receiving area has a pair of cameras, with the pair of cameras providing overlapping images of an entire side view of the wooden pallet.

10. The pallet inspection system according to claim 1, wherein the determined readability for each of a set of regions in the cropped image and based on a set of readability criteria thresholds corresponding to the set of regions.

11. The pallet inspection system according to claim 10, wherein: a first region of the set of regions is associated with a first readability criteria threshold and a second region of the set of regions is associated with a second readability criteria threshold that is different from the first readability criteria threshold, and the mark in the cropped image is classified as readable based on the first region meeting the first readability criteria threshold and the second region of the set of regions meeting the second readability criteria threshold.

12. A method for detecting heat treated marking on wooden pallet comprising:
   generating a plurality of images of the wooden pallet;
   performing object detection on each of the plurality of images to detect if a mark is present;
   cropping each image having the mark so that an area surrounding the mark within the image is removed;
   performing image segmentation on each cropped image so that pixels within the cropped image are classified into regions;
   determining readability of the regions in each cropped image based on respective readability criteria thresholds;
   classifying the mark in each cropped image as readable based on the mark meeting the respective readability criteria thresholds; and
   in response to a classification of a mark pair as readable,
      (i) reading a first set of alphanumeric characters from a first mark of the mark pair,
      (ii) reading a second set of alphanumeric characters from a second mark of the mark pair, and
      (iii) classifying the wooden pallet as being compliant in response to a match between the first set of alphanumeric characters and the second set of alphanumeric characters.

13. The method according to claim 12 wherein the classified regions for each cropped image comprise a boundary region, a symbol region, and an alphanumeric region, with the pixels in each region having a respective classification identifier associated therewith.

14. The method according to claim 13 wherein the boundary region has a rectangular shape with first and second opposing sides, and a divider line extending between one of opposing sides, with the symbol region and the alphanumeric region being enclosed by the boundary region and separated by the divider line.

15. The method according to claim 12 wherein the classified regions comprise a boundary region having a classification identifier associated therewith, and wherein determining readability of the boundary region comprises the following:

performing corner point detection to detect corner points;
sampling the pixels between the detected corner points;
determining a number of the sampled pixels having the same classification identifier; and
identifying the boundary region as being readable based on the determined number of sampled pixels having the same classification identifier exceeding a boundary region threshold.

16. The method according to claim 12 wherein the classified regions comprise a symbol region having a classification identifier associated therewith, and wherein determining readability of the symbol region comprises the following:
   sampling the pixels within the symbol region;
   determining a number of the sampled pixels having the same classification identifier; and
   identifying the symbol region as being readable based on the determined number of sampled pixels having the same classification identifier exceeding a symbol region threshold.

17. The method according to claim 12 wherein the classified regions comprise an alphanumeric region having a classification identifier associated therewith, and wherein determining readability of the alphanumeric region comprises the following:
   identifying the pixels within the alphanumeric region having the same classification identifier;
   determining a readability score for the identified pixels, with the readability score being selected within a readability scoring range; and
   identifying the alphanumeric region as being readable based on the readability score exceeding a readability score threshold.

18. The method according to claim 12 wherein the classified regions comprise an alphanumeric region having alphanumeric characters, and further comprising the following for each mark classified as readable:
   detecting lines within the alphanumeric region, with each line including alphanumeric characters; and
   performing optical character recognition to read the alphanumeric characters in each line.

19. The method according to claim 12 wherein the wooden pallet is received in a pallet receiving area, and wherein each side of the pallet receiving area has a single camera focused on a portion of a side view of the wooden pallet where the mark is expected to be located.

20. The method according to claim 12 wherein the wooden pallet is received in a pallet receiving area, and wherein each side of the pallet receiving area has a pair of cameras, with the pair of cameras providing overlapping images of an entire side view of the wooden pallet.

* * * * *